United States Patent
Kaneshige et al.

(10) Patent No.: US 8,684,845 B2
(45) Date of Patent: Apr. 1, 2014

(54) STORAGE MEDIUM STORING GAME PROGRAM AND GAME APPARATUS

(75) Inventors: Tsutomu Kaneshige, Kyoto (JP); Takayuki Shimamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 934 days.

(21) Appl. No.: 11/640,409

(22) Filed: Dec. 18, 2006

(65) Prior Publication Data

US 2007/0270220 A1 Nov. 22, 2007

(30) Foreign Application Priority Data

May 2, 2006 (JP) ................................. 2006-128417

(51) Int. Cl.
- A63F 9/24 (2006.01)
- A63F 13/00 (2006.01)
- G06F 17/00 (2006.01)
- G06F 19/00 (2011.01)

(52) U.S. Cl.
USPC ................... 463/43; 463/36; 463/37; 463/38; 463/39; 463/40; 463/47

(58) Field of Classification Search
USPC .......................... 463/36–40, 43, 47
See application file for complete search history.

(56) References Cited

U.S. PATENT DOCUMENTS

| 5,076,584 A * | 12/1991 | Openiano ........................ 463/36 |
| 6,508,708 B1 * | 1/2003 | Okubo ............................ 463/32 |
| 2003/0063115 A1 * | 4/2003 | Kaku et al. .................... 345/711 |
| 2006/0233098 A1 * | 10/2006 | McArdle ....................... 370/216 |

FOREIGN PATENT DOCUMENTS

| JP | 10-165648 | 6/1998 |
| JP | 2001-276416 | 10/2001 |
| JP | 2001-307129 | 11/2001 |

OTHER PUBLICATIONS

Office Action (2 pgs.) dated Jan. 31, 2012 issued in corresponding Japanese Application No. 2006-128417.
"Dengeki Game Cube", Media Works, Japan, Nov. 1, 2005, vol. 5, Issue No. 16, pp. 136-141.

* cited by examiner

*Primary Examiner* — Adetokunbo O Torimiro
(74) *Attorney, Agent, or Firm* — Nixon & Vanderhye P.C.

(57) ABSTRACT

A game system includes a game apparatus and a controller. For example, whether an operation of waving the controller has been performed is determined based on at least one of a pointed position on a display screen by the controller and acceleration. A wind object is generated and moved in virtual game space according to the waving operation. When it is determined that the wind object has collided with a windmill object disposed in the virtual game space, the windmill object is influenced by the wind and its rotation speed is changed.

24 Claims, 12 Drawing Sheets (A)

(B)

STORAGE MEDIUM STORING GAME PROGRAM AND GAME APPARATUS

CROSS REFERENCE OF RELATED APPLICATION

The disclosure of Japanese Patent Application No. 2006-128417 is incorporated herein by reference.

BACKGROUND

1. Field

Example embodiments of the present invention relate to a storage medium storing a game program and a game apparatus. More particularly, example embodiments of the present invention relate to a storage medium storing a game program and a game apparatus that represent wind in virtual game space.

2. Description of the Related Art

Examples of related art for representing generation of wind in virtual game space are disclosed in document 1 (Japanese Patent Application Laid-Open No. 2001-276416) and document 2 (Japanese Patent Application Laid-Open No. 2001-307129). In art of document 1, a plurality of wind generation sources are provided in given positions in object space. For a method of calculating wind to be caught by an object, in a point that is a calculation target, a vector of wind (force and direction of wind) to be caught from each generation source is calculated and the calculated wind vectors are combined, whereby wind (combined vector) to be caught by the object is determined.

In art of document 2, behavior of a particle object that is influenced by wind occurring according to movement of an object is represented. A table showing information on a plurality of virtual winds associated in advance with moving objects is set. Specifically, a reference position of wind, a wind direction, a wind force, and a range of influence of wind are defined. Although virtual wind moves along with movement of an object, the relative position between the object and the virtual wind does not change.

Neither of the art of documents 1 and 2 represents wind to be generated according to a player's operation, as an object. Particularly, in the art of document 1, since a vector of wind to be caught from each generation source is calculated and the calculated wind vectors are combined, whereby wind to be caught by an object is determined, there is a drawback in that arithmetic processing becomes complicated. On the other hand, in the art of document 2, since a plurality of virtual winds are set in a table so as to be associated in advance with objects, there is a drawback in that definitions of winds to be generated are restricted to associated objects. Furthermore, to generate wind at an arbitrary position in virtual game space according to a player's operation, a multiplicity of virtual winds need to be set in the table; accordingly, there is a drawback in that memory capacity increases.

SUMMARY

One aspect of example embodiments of the present invention is therefore to provide a novel storage medium storing a game program and a game apparatus.

Another aspect of example embodiments of the present invention is to provide a storage medium storing a game program and a game apparatus that are capable of representing wind to be generated in virtual game space according to a player's operation, by a simple process and with a small memory capacity.

A storage medium storing a game program of a first example embodiment of the present invention is a storage medium storing a game program for a game apparatus that has an operation apparatus to be operated by a player and displays a movable object disposed in virtual game space on a display apparatus. The game program in the storage medium causes a processor of the game apparatus to perform a wind object generation step, a wind object movement step, a collision determination step, and a movable object control step. In the wind object generation step, a wind object is generated in the virtual game space according to operation data from the operation apparatus. In the wind object movement step, the wind object is moved. In the collision determination step, a collision between the wind object and the movable object is determined. In the movable object control step, when it is determined in the collision determination step that the collision has occurred, the movable object is moved.

Specifically, the game program stored in the storage medium causes wind to be generated in the virtual game space according to a player's operation, and includes the following steps to be performed by the processor (28; reference numeral corresponding to that in the embodiments and the same applies to the following) of a game apparatus (12). The game apparatus includes the operation apparatus (14) and displays a movable object (90) disposed in the virtual game space on the display apparatus (16). In the wind object generation step (S9 to S15 and S71 to S77), a wind object (92) is generated in the virtual game space according to operation data. As such, wind to be generated according to a player's operation is represented using an object. The wind object is formed of transparent polygons in the embodiments and is not displayed on a game screen. For example, a wind object is generated in a position calculated based on operation data or in a predetermined position. In the wind object movement step (S17, S31, and S79), the wind object is moved. For example, the wind object may be moved in a direction connecting a viewpoint to its generation position and may be moved at a speed calculated based on operation data. In the collision determination step (S35), the collision between the wind object and the movable object is determined. That is, whether the movable object is influenced by the wind is determined. In the movable object control step (S19 and S81), when it is determined that the collision has occurred, the movable object is moved. In the embodiments, the movable object is a windmill and its rotation speed changes by being influenced by wind.

As such, since wind to be generated according to a player's operation is represented using an object, whether there is an influence of wind can be determined by a collision determination and wind can be represented in an arbitrary position in the virtual game space. Therefore, wind can be represented by a simple process and with a small memory capacity.

In one aspect, the operation apparatus may have a motion detection means for detecting a motion of the operation apparatus. The game program may further cause the processor of the game apparatus to perform a motion state detection step of detecting a motion state of the operation apparatus based on the motion of the operation apparatus. In the wind object generation step, when the motion state is a predetermined state, the wind object may be generated.

Specifically, the motion detection means (56 and 64) of the operation apparatus detects a motion of the operation apparatus itself. In the motion state detection step (S1 to S7 and S61 to S67), a motion state is detected based on the motion of the operation apparatus. In the wind object generation step, when the motion state is the predetermined state, a wind object is generated. Thus, a game in which wind is generated in the virtual game space by allowing the operation apparatus itself to move to the predetermined state, can be implemented.

In another aspect, the motion detection means may include an imaging means for imaging an imaging target that indicates a position of the operation apparatus. The game program may further cause the processor of the game apparatus to perform a coordinate calculation step and an amount-of-change-in-coordinate calculation step. In the coordinate calculation step, coordinates in the virtual game space are calculated based on the position of the imaging target imaged by the imaging means. In the amount-of-change-in-coordinate calculation step, an amount of change in the coordinates in a unit of time is calculated. In the wind object generation step, when the amount of change satisfies a predetermined condition, the wind object may be generated.

Specifically, the motion detection means includes the imaging means (70), and by the imaging means an imaging target (18a and 18b) that indicates a position of the operation apparatus is imaged. In the embodiments, the imaging target is two infrared markers provided near the display apparatus and positions of the markers in an imaged image are detected. In the coordinate calculation step (S3), coordinates in the virtual game space are calculated based on the position of the imaging target. For example, a pointed position by the operation apparatus is calculated from positions of the markers and the pointed position is converted into coordinates in the virtual game space, whereby coordinates of a corresponding position are calculated. In the amount-of-change-in-coordinate calculation step (S5), an amount of change in coordinates in a unit of time is calculated. In the embodiments, a difference between coordinates in a current frame and coordinates in a previous frame is calculated. In the wind object generation step, when a predetermined condition such that the amount of change is greater than a predetermined threshold is satisfied, a wind object is generated. Coordinates in the virtual game space based on the position of the operation apparatus change by moving the operation apparatus. If this amount of change in coordinates satisfies the predetermined condition, wind is generated in the virtual game space. Therefore, a novel game in which a wind object is generated in the virtual game space by an unprecedented operation, such as waving the operation apparatus, can be provided.

In still another aspect, the game program may further cause the processor of the game apparatus to perform a division step of dividing the amount of change into regular intervals. In the wind object generation step, wind objects may be generated in positions between which the regular intervals are provided by the division in the division step.

That is, generation positions are calculated by dividing the amount of change in coordinates into regular intervals in the division step (S9) and wind objects are generated in the generation positions, respectively. Thus, a plurality of wind objects can be generated at regular distances. As such, the number of wind objects to be generated can be changed according to the degree of waving the operation apparatus.

In another aspect, the motion detection means may include an acceleration sensor. The game program may further cause the processor of the game apparatus to perform an acceleration obtaining step of obtaining acceleration detected by the acceleration sensor. In the wind object generation step, when the acceleration satisfies a predetermined condition, the wind object may be generated.

Specifically, an acceleration sensor is provided to the operation apparatus. In the acceleration obtaining step (S61), acceleration detected by the acceleration sensor is obtained. In the wind object generation step, when the acceleration satisfies the predetermined condition (S63), a wind object is generated. By moving the operation apparatus, acceleration to be detected by the acceleration sensor changes. Thus, a novel game in which by using the acceleration sensor, a wind object is generated in the virtual game space by an unprecedented operation, such as waving the operation apparatus, can be provided.

In still another aspect, the game program may further cause the processor of the game apparatus to perform a number setting step of setting a number of wind objects according to the acceleration. In the wind object generation step, wind objects whose number is set in the number setting step may be generated in positions between which regular intervals are provided.

Namely, in the number setting step (S71) the number of wind objects to be generated is set according to acceleration, and in the wind object generation step wind objects whose number is set are generated in positions spaced by regular intervals. As such, by using the acceleration sensor, the number of wind objects to be generated can be changed according to the degree of waving the operation apparatus.

In another embodiment, the acceleration sensor may detect at least acceleration in a first direction of the operation apparatus and acceleration in a second direction that is different from the first direction. In the wind object generation step, when the acceleration in the first direction is obtained, the wind object may be generated.

That is, only when acceleration in a predetermined direction is detected by the acceleration sensor, wind is generated. Thus, an operation that the operation apparatus is used to resemble a fan or the like in a pseudo manner, such as generating wind when the operation apparatus is waved in an up-down direction, for example, and not generating wind when the operation apparatus is waved in a left-right direction, can be implemented.

In still another aspect, each of the movable object and the wind object may be formed as a sphere having central coordinates and a diameter of a predetermined length. In the collision determination step, the collision between the movable object as the sphere and the wind object as the sphere may be determined. The game program may further cause the processor of the game apparatus to perform a distance calculation step of calculating, when it is determined in the collision determination step that the collision has occurred, a distance between the central coordinates of the movable object and the central coordinates of the wind object. In the movable object control step, a motion state of the movable object may be changed according to the distance calculated in the distance calculation step.

Specifically, the movable object and the wind object each are formed in a spherical shape, and in the collision determination step the collision between spheres is determined. In the distance calculation step (S37), the distance between the central coordinates of the movable object and the central coordinates of the wind object is calculated. In the movable object control step, a motion state of the movable object changes according to the distance between the wind object and the movable object. Therefore, representation that the strength of wind that exerts an influence on the movable object changes by the positional relationship between the movable object and the wind object can be implemented by a simple process.

In another embodiment, in the wind object movement step, the wind object is moved at a speed according to a change in the motion of the operation apparatus detected in the motion state detection step.

Specifically, in the wind object movement step, a speed according to a change in the motion of the operation apparatus is calculated (S13) and the wind object is moved at the speed.

For example, an initial speed of the wind object is determined according to an amount of change in pointed position by the operation apparatus. Thus, the wind object can be moved at a speed according to a motion state of the operation apparatus. For example, the speed of the wind object can be changed according to the speed of an operation of waving the operation apparatus.

A game apparatus of a second invention according to the present invention is a game apparatus that has an operation apparatus to be operated by a player and displays a movable object to be disposed in virtual game space on a display apparatus. The game apparatus comprises a wind object generation means, a wind object movement means, a collision determination means, and a movable object control means. The wind object generation means generates a wind object in the virtual game space according to operation data from the operation apparatus. The wind object movement means moves the wind object. The collision determination means determines a collision between the wind object and the movable object. The movable object control means moves the movable object when it is determined by the collision determination means that the collision has occurred.

The second example embodiment of the present invention is directed to a game apparatus corresponding to the storage medium storing a game program of the above-described first example embodiment of the present invention, and provides the same advantageous effects as those provided by the above-described first example embodiment of the present invention.

According to an example embodiment of the present invention, wind to be generated according to a player's operation is represented using an object and a movable object in the virtual game space is allowed to move by being collided with the wind object, and thus, wind to be generated according to a player's operation can be represented by a simple process and with a small memory capacity.

The above described features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 3(A) is a perspective view of the controller as viewed from the top rear side and FIG. 3(B) is a perspective view of the controller as viewed from the bottom rear side;

DETAILED DESCRIPTION OF EXAMPLE EMBODIMENTS

Figure 1:
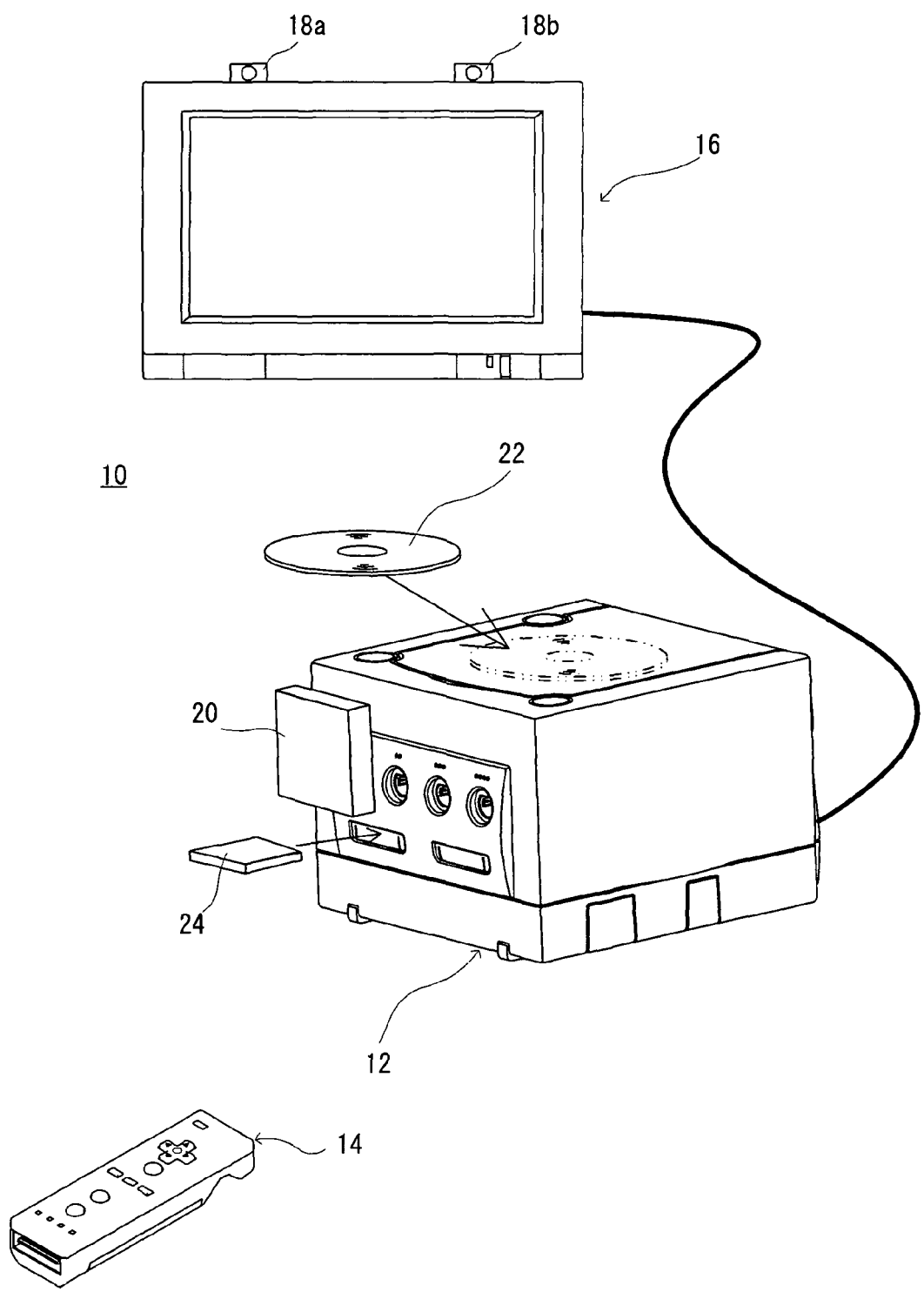
FIG. 1 is an external view showing an exemplary game system according to an example embodiment of the present invention.

Referring to FIG. 1, a game system 10 includes a game apparatus 12 and a controller 14. The game apparatus 12 is a game console connected via a cable to a display or monitor 16 such as a home television receiver. The controller 14 is an operation apparatus that is manipulated by a player or user and provides operation data to the game apparatus 12.

Two markers 18a and 18b are placed on the periphery of the monitor 16 (the upper side of a screen of the monitor 16 in FIG. 1) with a predetermined interval provided therebetween. The markers 18a and 18b are to indicate a position of the controller 14. Specifically, the markers 18a and 18b are infrared LEDs and each of the markers 18a and 18b outputs infrared light toward the front of the monitor 16. The markers 18a and 18b are imaging targets for the controller 14. As will be described later, the controller 14 also functions as an optical pointing device.

The game apparatus 12 is connected with a receiving unit 20 via a connection terminal. The receiving unit 20 receives operation data transmitted wirelessly from the controller 14. More specifically, the controller 14 uses a wireless communication technique such as Bluetooth (registered trademark) to transmit operation data to the game apparatus 12 to which the receiving unit 20 is connected.

In addition, an optical disk 22 is attached to or detached from the game apparatus 12, as an example of information storage medium that is replaceably used in the game apparatus 12. Provided on an upper main surface of the game apparatus 12 are a power ON/OFF switch for the game apparatus 12, a reset switch for game processing and an OPEN switch for opening the upper cover of the game apparatus 12. When the player presses the OPEN switch, the aforesaid cover is opened, whereby the optical disk 22 is attached to or detached from the game apparatus 12. Moreover, an external memory card 24 is detachably attached to the game apparatus 12 as required. A flash memory etc. contained in the memory card 24 store saved data and the like.

The game apparatus 12 executes a game program stored in the optical disk 22 and displays results of the execution as a game image on the monitor 16. The game apparatus 12 may also use saved data stored in the external memory card 24 to reproduce the state of a game executed in the past and display the game image on the monitor 16. A speaker 26 (see FIG. 2) provided in the monitor 16 outputs a game sound. The player plays a virtual game by operating the controller 14 while viewing the game image displayed on the monitor 16.

Figure 2:
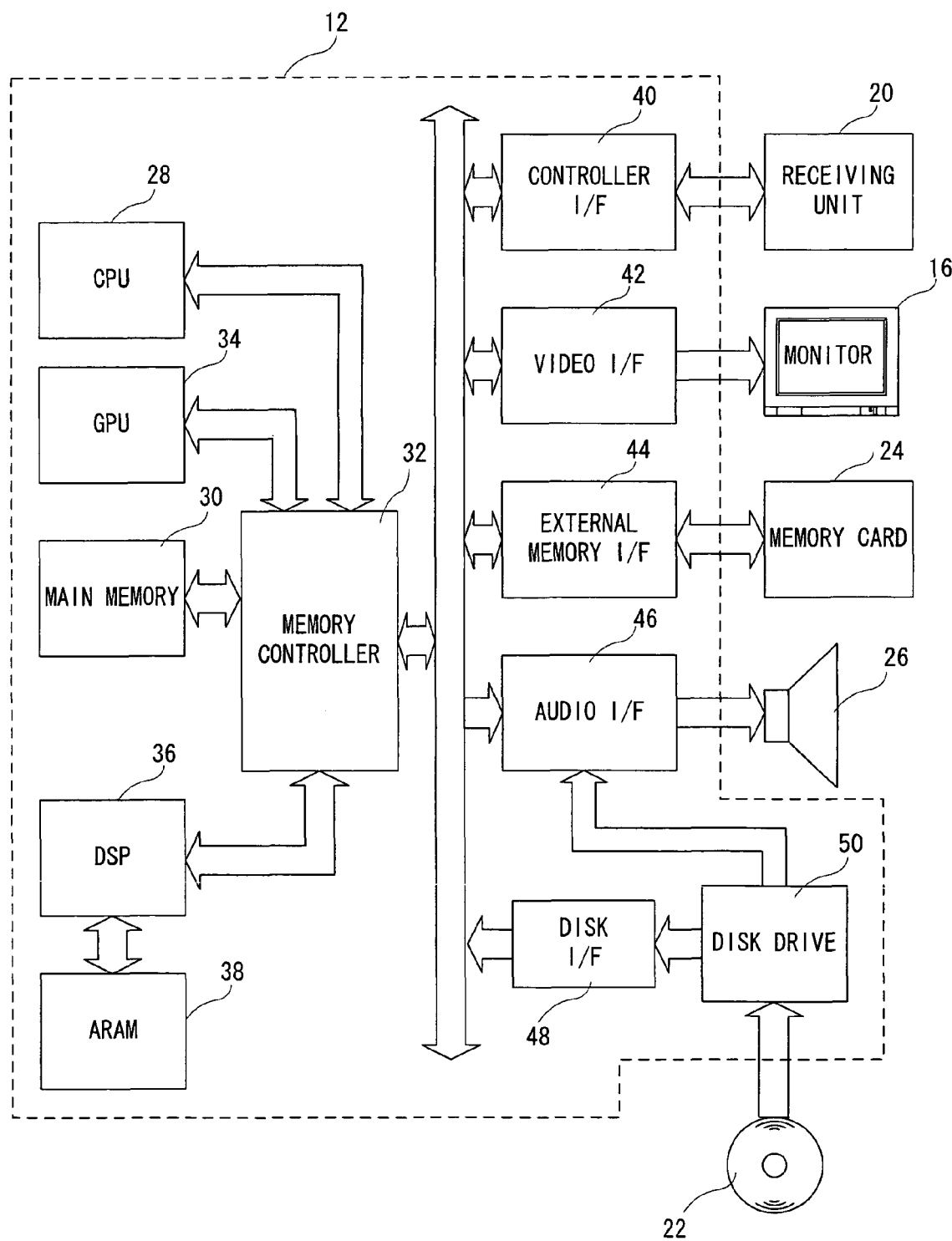
FIG. 2 is a block diagram showing an exemplary electrical configuration of a game apparatus in FIG. 1.

FIG. 2 shows one example of electrical configuration of the game apparatus 12. The game apparatus 12 includes a RISC CPU (Central Processing Unit) 28 for executing various programs, for example. The CPU 28 executes a boot program stored in a boot ROM not shown, initializes memories such as a main memory 30, loads a game program and data stored in the optical disk 22, and then carries out game processing according to the game program.

The CPU 28 is connected via a memory controller 32 with a GPU (Graphics Processing Unit) 34, the main memory 30, a DSP (Digital Signal Processor) 36, and an ARAM (Audio RAM) 38. The memory controller 32 is connected via a predetermined bus with a controller I/F (Interface) 40, a video I/F 42, an external memory I/F 44, an audio I/F 46, and a disk I/F 48, which are connected with the receiving unit 20, the monitor 16, the external memory card 24, the speaker 26, and the disk drive 50, respectively.

The GPU 34 performs image processing under instructions from the CPU 28. For example, the GPU 34 is formed by a semiconductor chip that performs calculations required for display of 3D graphics. For image processing, the GPU 34 uses a memory dedicated for image processing and some memory area of the main memory 30. The GPU 34 generates game image data and movie pictures to be displayed, and outputs them to the monitor 16 via the memory controller 32 and the video I/F 42 as appropriate.

The main memory 30 is a memory area used by the CPU 28, and stores appropriately a game program and data required by the CPU 28 for game processing. For instance, the main memory 30 stores the game program and various kinds of data, etc. read by the CPU 28 from the optical disk 22.

The DSP 36 serves as a sound processor connected with the ARAM 38 for storage of sound data, etc. The ARAM 38 is used for a predetermined process (e.g. storing previously read game program and sound data). The DSP 36 reads the sound data stored in the ARAM 38, outputs the sound from the speaker 26 provided in the monitor 16 via the memory controller 32 and the audio I/F 46 based on the data.

The memory controller 32 controls centrally data transfer and is connected with the above mentioned I/Fs. The controller I/F 40 is formed by four controller I/Fs, for example, and connects the game apparatus 12 communicably with an external device via connectors possessed by those controller I/Fs. For instance, the receiving unit 20 is engaged with the above mentioned connector and connected to the game apparatus 12 via the controller I/F 40. As described above, the receiving unit 20 receives operation data from the controller 14, and outputs it to the CPU 28 via the controller I/F 40. In another embodiment, the game apparatus 12 may contain inside a receiving module for receiving operation data transmitted from the controller 14, instead of the receiving unit 20. In this case, the transmission data received by the receiving module is output to the CPU 28 via a predetermined bus.

The video I/F 42 is connected with the monitor 16 on which a game image is displayed according to an image signal from the video I/F 42. The external memory I/F 44 is connected with the external memory card 24. The CPU 28 accesses a flash memory, etc. provided in the external memory card 24 via the memory controller 32.

The audio I/F 46 is connected with the speaker 26 contained in the monitor 16. The audio I/F 46 provides the speaker 26 with an audio signal corresponding to sound data read from the ARAM 38 or generated by the DSP 36 and the sound data directly output from the disk drive 50. The speaker 26 outputs the sound.

The disk I/F 48 is connected with the disk drive 50 which reads data stored in the optical disk 22 in a predetermined reading position. The read data is written into the main memory 30 via the disk I/F 48 and the memory controller 32, etc., or is output to the audio I/F 46.

Figure 3:
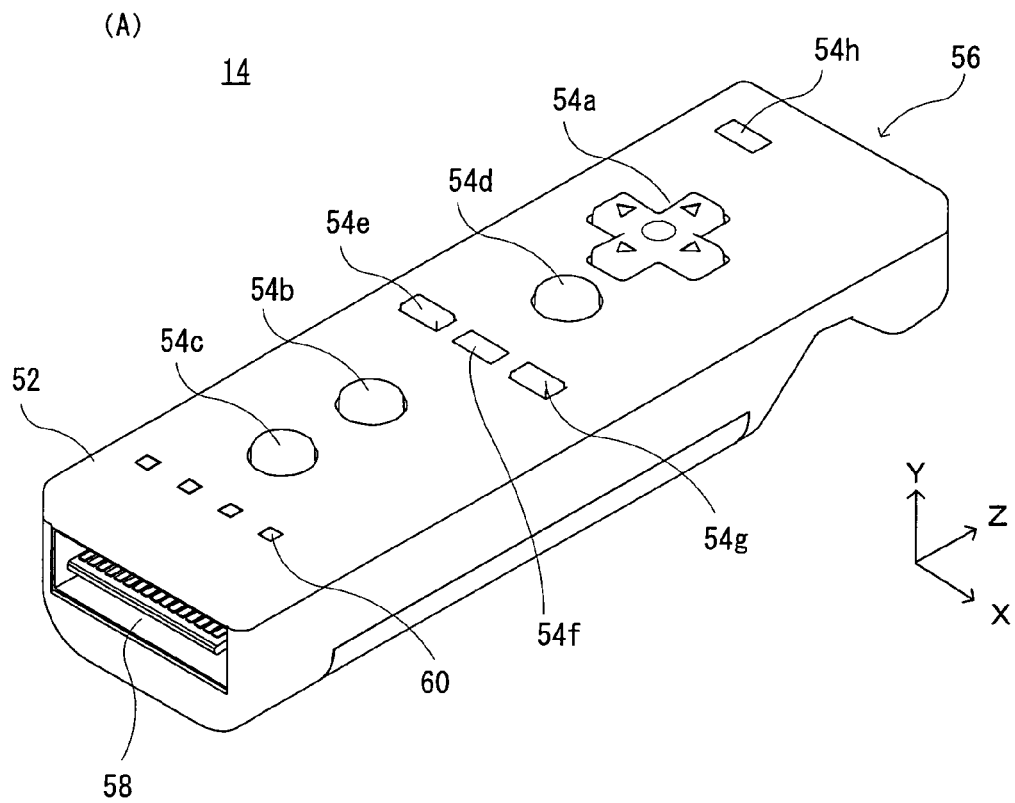
FIG. 3 is an illustrative view showing an exemplary controller in FIG. 1
Figure 3:
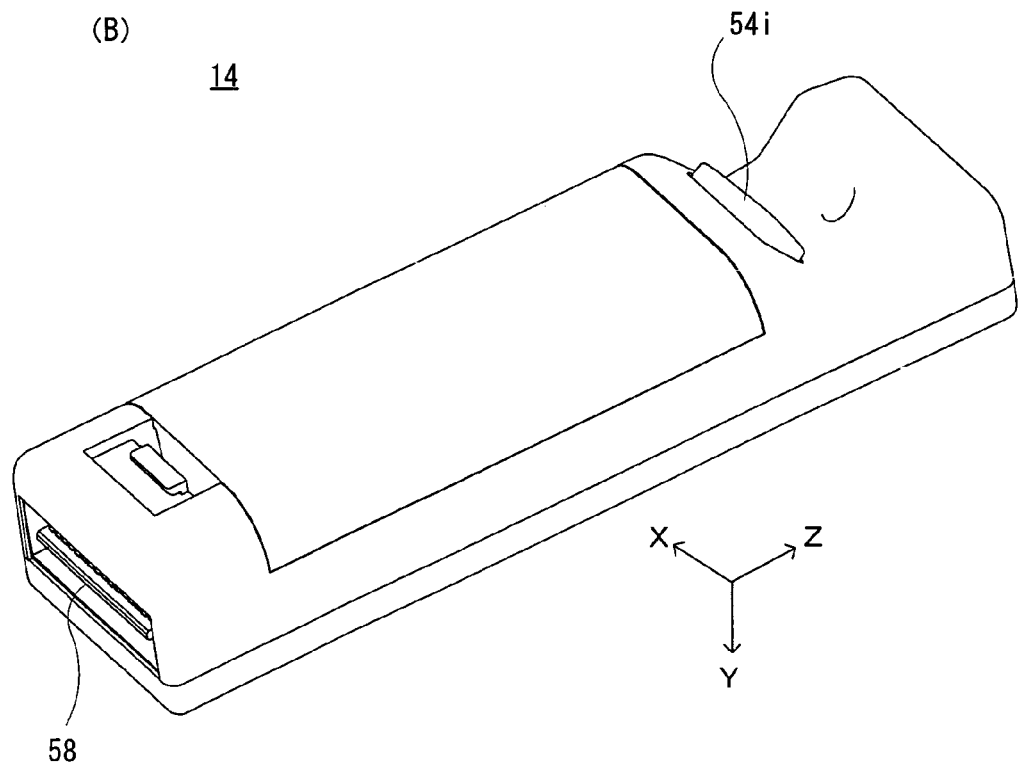
Figure 4:
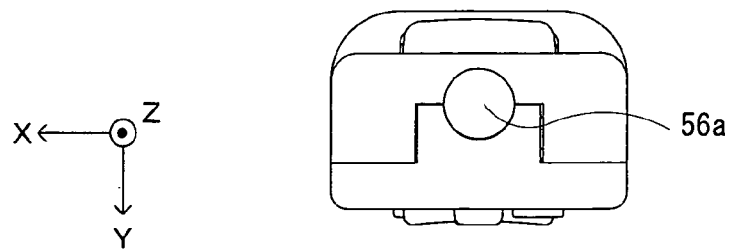
FIG. 4 is a front view of the controller in FIG. 1 as viewed from the front.

FIG. 3 and FIG. 4 show one example of outline view of the controller 14. FIG. 3 (A) is an oblique perspective view of the controller 14 seen from the upper rear side, and FIG. 3 (B) is an oblique perspective view of the controller 14 seen from the lower rear side. FIG. 4 is a front view of the controller 14 seen from the front.

Referring to FIG. 3 and FIG. 4, the controller 14 has a housing 52 formed by plastic molding, for example. The housing 52 is of an approximately rectangular solid shape with longer sides in the back-and-forth direction (Z-axis direction shown in FIG. 3), and is of size capable of being held by one hand of an adult or child as a whole. The player can perform game operations by pressing buttons arranged on the controller 14 or by changing the position or orientation of the controller 14 itself. In one game, for instance, the player can move a target object by rotating the controller 14 around its longer direction. In addition, the player can move an object appearing in game space by performing an operation of changing a position on the screen pointed to by the controller 14. Here, the "position on the screen pointed to by the controller 14" is ideally a position where a straight line extending from a front end of the controller 14 to the longitudinal direction intersects with the screen of the monitor 16, however, does not strictly need to be such a position. A position around such a position should be calculated by the game apparatus 12. Hereinafter, a position (on the screen) to be pointed to by the controller 14 is called a "pointed position". The longitudinal direction of the controller 14 (housing 52) may be called the "pointed direction by the controller 14".

The housing 52 is provided with a plurality of operating buttons. Provided on an upper surface of the housing 52 are a cross key 54*a*, an X button 54*b*, a Y button 54*c*, an A button 54*d*, a select switch 54*e*, a menu switch 54*f*, and a start switch 54*g*. Meanwhile, a lower surface of the housing 52 has a concave portion, and a B button 54*i* is provided on a rear-side inclined surface of the concave portion. Each of these buttons (switches) 54 is given a function according to a game program executed by the game apparatus 12. However, the detailed description of the function of each buttons is omitted. In addition, a power switch 54*h* for remotely turning on/off the game apparatus 12 is provided on the upper surface of the housing 52.

The controller 14 has an imaging information computing section 56 (see FIG. 5) and, as shown in FIG. 4, a light entering opening 56*a* of the imaging information computing section 56 is provided to the front of the housing 52. On the other hand, a connector 58 is provided on a rear surface of the housing 52. The connector 58 is, for example, a 32-pin edge connector used for connection of another device to the controller 14. A plurality of LEDs 60 is provided at a rear side of the upper surface of the housing 52. The controller 14 is given a controller type (number) for discrimination from other controllers 14. When the controller 14 transmits operation data to the game apparatus 12, one LED 60 corresponding to the currently set controller type of the controller 14 lights up.

Figure 5:
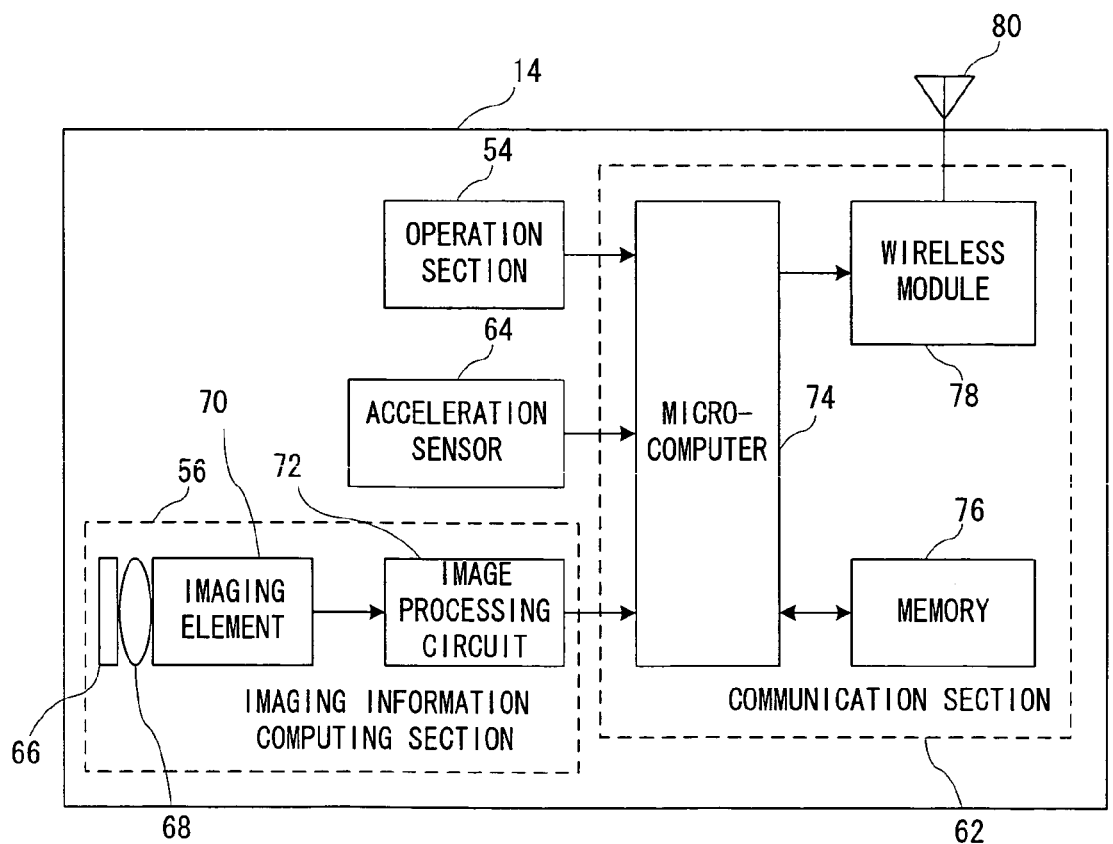
FIG. 5 is a block diagram showing an exemplary electrical configuration of the controller in FIG. 1.

FIG. 5 shows an electrical configuration of the controller 14. The controller 14 comprises inside a communication section 62 and an acceleration sensor 64 as well as the operation section 54 (the operating buttons 54*a* to 54*i*) and the imaging information computing section 56.

The imaging information computing section 56 is a system for analyzing image data imaged by an imaging means and discriminating therefrom a location with a high brightness, thereby detecting a position of the center of gravity of the location, a size of the location, and the like. The imaging information computing section 56 has a sampling period of up to the order of 200 frames per second, for example, and thus can track and analyze even relatively high speed motion of the controller 14.

Specifically, the imaging information computing section 56 includes an infrared filter 66, a lens 68, an imaging element 70, and an image processing circuit 72. The infrared filter 66 allows only infrared rays from light entered through the opening 56a at the front of the controller 14 to pass therethrough. Here, the markers 18a and 18b disposed near the display screen of the monitor 16 are infrared LEDs that output infrared light toward the front of the monitor 16. Therefore, by providing the infrared filter 66, images of the markers 18a and 18b can be more accurately imaged. The lens 68 collects infrared rays having passed through the infrared filter 66 and emits the collected infrared rays to the imaging element 70. The imaging element 70 is a solid-state imaging element, such as a CMOS sensor or a CCD, and images the infrared rays collected by the lens 68. Thus, the imaging element 70 images only infrared rays having passed through the infrared filter 66, and generates image data. Hereinafter, an image imaged by the imaging element 70 is called an "imaged image". The image data generated by the imaging element 70 is processed by the image processing circuit 72. The image processing circuit 72 calculates positions of the imaging targets (markers 18a and 18b) in the imaged image. The imaging processing circuit 72 outputs coordinate values indicating the positions of the markers 18a and 18b in the imaged image, to the communication section 62 as imaging data.

The acceleration sensor 64 detects, out of accelerations applied to a detection part of the acceleration sensor, the acceleration of a line component for each sensing axis and the acceleration of gravity. For example, the biaxial or triaxial acceleration sensor detects the accelerations applied to the detection part of the acceleration sensor, as accelerations of straight line components along the axes. More specifically, in this embodiment, the triaxial acceleration sensor is used to detect the accelerations of the controller 14 in the directions of the three axes, the up-and-down direction (Y-axis direction in FIG. 3), the right-and-left direction (X-axis direction in FIG. 3) and the back-and-forth direction (Z-axis direction in FIG. 3). Additionally, it is possible to calculate the inclination and rotation of the controller 14 by subjecting each of the accelerations detected for the axes by the acceleration sensor 64 to a predetermined arithmetical operation. That is, the game apparatus 12 not only can calculate a rotation angle around the Z axis of the controller 14 from the imaged image but also can calculate, by the acceleration sensor 64, a rotation angle of the controller 14. For example, the acceleration of gravity is always applied to the acceleration sensor 64 in a stationary state, and the acceleration of each axis is detected according to the inclination of each axis with respect to the acceleration of gravity. More specifically, when the acceleration sensor 64 is standing still in a horizontal position, the acceleration of gravity of 1 G is applied to the Y axis of the acceleration sensor, and the accelerations of the other axes become approximately zero. Then, when the acceleration sensor 64 is inclined from a horizontal position, the acceleration of gravity is distributed among the axes of the acceleration sensor 64 according to the angle between the direction of each axis of the acceleration sensor 64 and the direction of gravity, and the value of acceleration of each axis of the acceleration sensor 64 is detected. By performing an arithmetical operation with such value of acceleration of each axis, it is possible to calculate the position of the acceleration sensor 64 with respect to the direction of gravity.

For the acceleration sensor 64, a biaxial acceleration sensor may be used to detect the accelerations in any combination of directions of two axes among the up-and-down direction, the right-and-left direction and the back-and-forth direction, depending on the kind of a required operation signal.

Data on the accelerations detected by the acceleration sensor 64 is output to the communication section 62. The acceleration sensor 64 is typically a capacitance-type acceleration sensor.

The communication section 62 includes a microcomputer 74, a memory 76, a wireless module 78 and an antenna 80. The microcomputer 74 controls the wireless module 78 for transmitting acquired data wirelessly while using the memory 76 as a memory area during the process.

The data output from the operation section 54, the acceleration sensor 64 and the imaging information computing section 56 to the microcomputer 74 is temporarily stored in the memory 76. Here, wireless transmission from the communication section 62 to the receiving unit 20 is carried out in a predetermined cycle. Since the game process is generally performed each 1/60 second, the wireless transmission needs to be carried out in a shorter or equal cycle. When timing for transmission to the receiving unit 20 has come, the microcomputer 74 outputs the data stored in the memory 76 as operation data to the wireless module 78. The wireless module 78 uses Bluetooth (registered trademark) technique to modulate a carrier wave at a predetermined frequency by operation data and emit a weak radio wave signal through the antenna 80. That is, the operation data is modulated in the wireless module 78 into a weak radio wave signal and transmitted from the controller 14. The weak radio wave signal is received by the receiving unit 20 of the game apparatus 12. By demodulating or decoding the received weak radio wave signal, the game apparatus 12 can obtain the operation data. The CPU 28 of the game apparatus 12 performs the game processing based on the operation data acquired from the controller 14.

The shape of the controller 14, and the shapes, number and layout of the operating switches 54, etc, as shown in FIG. 3 and FIG. 4, are mere examples and may be changed as appropriate to any other shapes, numbers and layouts. The position of the imaging information computing section 56 (the light entering opening 56a of the imaging information computing section 56) in the controller 14 does not need to be at the front of the housing 52 and it may be provided at any other side as long as light can be taken in from outside the housing 52. At this time, the "pointed direction by the controller 14" is a direction perpendicular to the light entering opening 56a.

Through the use of the controller 14, the player can perform game operations such as moving and rotating the controller 14 in addition to conventional typical game operations such as pressing the operating switches. A game operation using the controller 14 will be described below.

Figure 6:
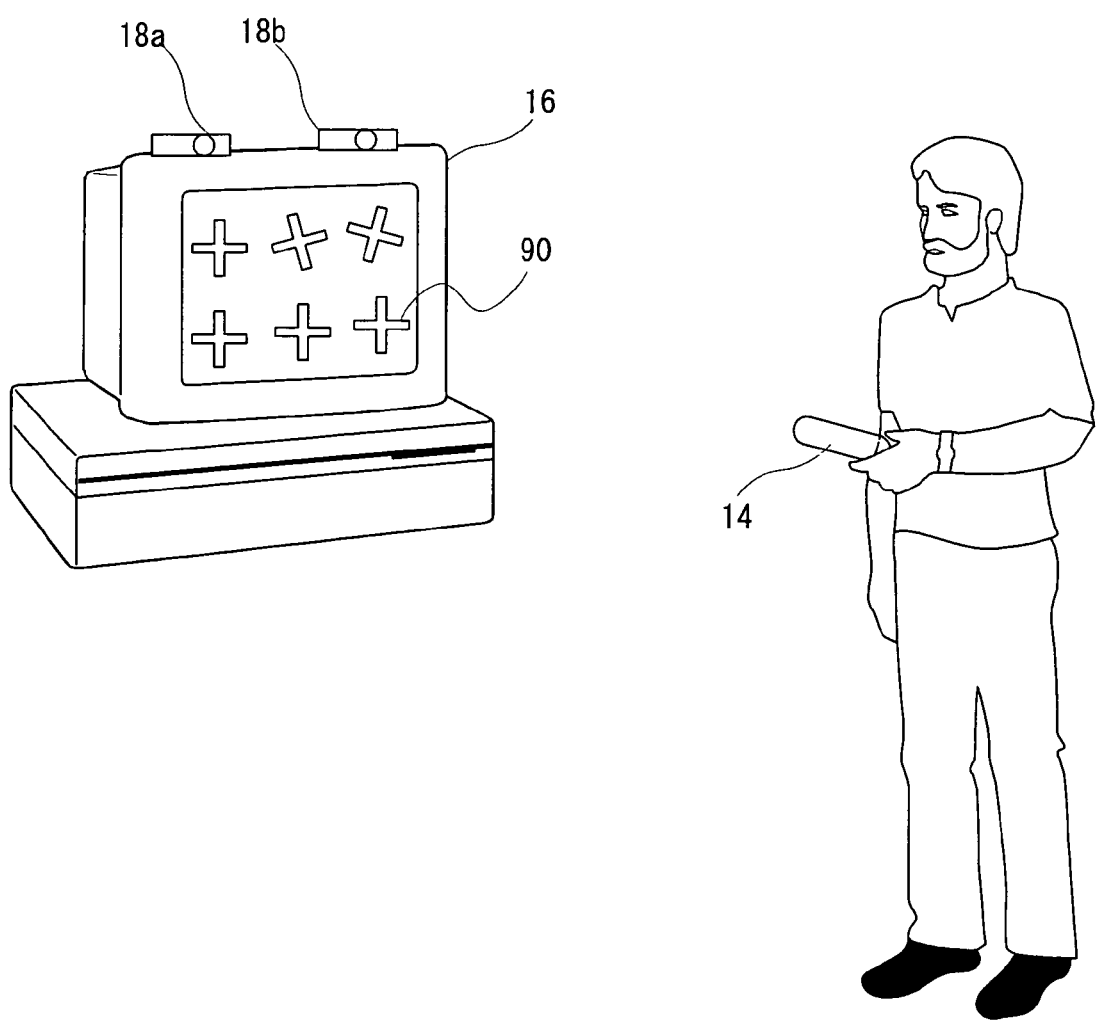
FIG. 6 is an illustrative view showing a scene when a player performs a game operation using the controller.

FIG. 6 is an illustrative view outlining a state when a game operation is performed using the controller 14. As shown in FIG. 6, when in the game system 10 a game is played using the controller 14, a player holds the controller 14 with one hand. Here, the markers 18a and 18b are disposed parallel to a horizontal direction of the screen of the monitor 16. The player holds the controller 14 in a state in which the front of the controller 14 (the side of the opening through which light to be imaged by the imaging information computing section 56 enters) is oriented to the direction of the markers 18a and 18b. In this state, the player performs a game operation by changing a position on the screen pointed to by the controller 14 or changing a distance between the controller 14 and each of the markers 18a and 18b.

Note that the markers 18a and 18b radiate infrared light in a predetermined viewing angle range and the imaging element 70 in the imaging information computing section 56 of the controller 14 can receive light that enters in a predetermined viewing angle range with a sight line direction (the Z-axis direction in FIG. 3) of the controller 14 being the center. Hence, the player holds the controller 14 in a position and an orientation in which the imaging element 70 can receive infrared light from the two markers 18a and 18b. Specifically, the player holds the controller 14 in a state in which at least one of the markers 18a and 18b is present in the viewing angle and the controller 14 is present in the viewing angle of at least one of the markers 18a and 18b. In this state, the controller 14 can detect the marker 18a and/or the marker 18b. The player can perform a game operation by changing the position and orientation of the controller 14 in a range satisfying this state. When the position and orientation of the controller 14 are outside this range, a game operation based on a pointing by the controller 14 cannot be performed. Hereinafter, the aforementioned range is called the "operable range".

When the controller 14 is held within the operable range, images of the markers 18a and 18b are imaged by the imaging information computing section 56. That is, an imaged image to be obtained by the imaging element 70 includes images of the markers 18a and 18b (target images) which are imaging targets. By using image data on the imaged image including the target images, the image processing circuit 72 calculates coordinates (marker coordinates) representing positions of the markers 18a and 18b in the imaged image.

In the image data on the imaged image, the target images appear as high brightness portions with a predetermined size. Thus, the image processing circuit 72 detects high brightness portions as candidates for the target images and determines whether the sizes of the detected high brightness portions are within a predetermined size range. If a high brightness portion has a size within the predetermined range, then it is determined that the high brightness portion represents one of the target images. If a high brightness portion does not have a size within the predetermined range, then it is determined that the high brightness portion represents an image other than the target images.

Furthermore, the image processing circuit 72 calculates positions of high brightness portions having been determined, as a result of the above-described determination process, to represent the target images. Specifically, positions of the center of gravity of the high brightness portions are calculated. Here, coordinates of the positions of the center of gravity are called "marker coordinates". The positions of the center of gravity can be calculated at a more detailed scale than the resolution of the imaging element 70. Here, it is assumed that the resolution of the imaged image imaged by the imaging element 70 is 126×96 and the positions of the center of gravity are calculated at a scale of 1024×768. That is, the marker coordinates are represented as integer values from (0, 0) to (1024, 768). Positions in the imaged image are represented in a coordinate system (xy coordinate system) with the upper left of the imaged image as the origin, the downward direction as the positive direction of the y-axis, and the rightward direction as the positive direction of the x-axis. When the target images are detected properly, two high brightness portions are determined as the target, images by the above-described determination process, and thus, marker coordinates of two points are calculated by the above-described calculation process. The image processing circuit 72 outputs data indicating the marker coordinates of the two points calculated by the above-described calculation process. The outputted data on the marker coordinates is, as described above, transmitted as operation data to the game apparatus 12 by the microcomputer 74.

The game apparatus 12 can calculate the pointed position by the controller 14 by using the data on the marker coordinates included in the received operation data. Specifically, a position of the midpoint of the two sets of marker coordinates is adopted as a position to which the controller 14 is oriented, i.e., the pointed position.

The game apparatus 12 can calculate a distance from the controller 14 to each of the markers 18a and 18b. Specifically, since a distance between the target images in the imaged image changes according to a distance between the controller 14 and the markers 18, by calculating a distance between the two sets of marker coordinates, the game apparatus 12 can grasp a distance between the controller 14 and each of the markers 18a and 18b.

The game apparatus 12 can also grasp a torsion, i.e., a rotation, around the Z axis of the controller 14. Specifically, when the controller 14 is rotated around the Z axis, the marker images in the imaged image also rotate and thus the game apparatus 12 can grasp a rotation around the Z axis of the controller 14 by calculating an angle of a vector connecting the two sets of marker coordinates. When the controller 14 is being rotated around the Z axis, the positions of the two sets of marker coordinates in the imaged image are also rotating and thus a pointed position, which is the midpoint, such as the one described above, may be corrected according to the degree of rotation around the Z axis of the controller 14.

When a single set of marker coordinates is detected, a pointed position by the controller 14 cannot be calculated. However, if two sets of marker coordinates are detected in a previous frame, the other one set of current marker coordinates may be estimated based on the previous marker coordinates. Alternatively, without performing estimation, only when two sets of marker coordinates are detected, a pointed position may be calculated.

In the game system 10, wind is generated in the virtual game space according to an operation on the controller 14 by the player. Specifically, the player can generate wind in the virtual game space by moving the controller 14 to a predetermined state. For example, the player can cause wind by moving the controller 14 in a waving manner. As can be seen from a display screen in FIG. 6, windmill objects 90 as movable objects are disposed in the virtual game space. The windmill objects 90 move by catching wind generated according to a player's operation. Specifically, the rotation states of the windmill objects 90 change by the influence of wind.

In the embodiment, wind to be generated according to a player's operation is represented by using an object. That is, wind objects 92 (see FIG. 8) are generated and moved in the virtual game space according to an operation on the controller 14 by the player. By generating and moving a wind object 92, it becomes possible to exert an influence of wind in an arbitrary position in the virtual game space. Specifically, whether a windmill object 90 disposed in the virtual game space is influenced by wind can be simply determined by a collision determination between the wind object 92 and the windmill object 90. As such, a wind object 92 is used, just by preparing data on the object, i.e., by using a small amount of data, wind can be introduced in an arbitrary position in the virtual game space and the influence of the wind can be exerted on other objects in the virtual game space by a simple process.

Figure 7:
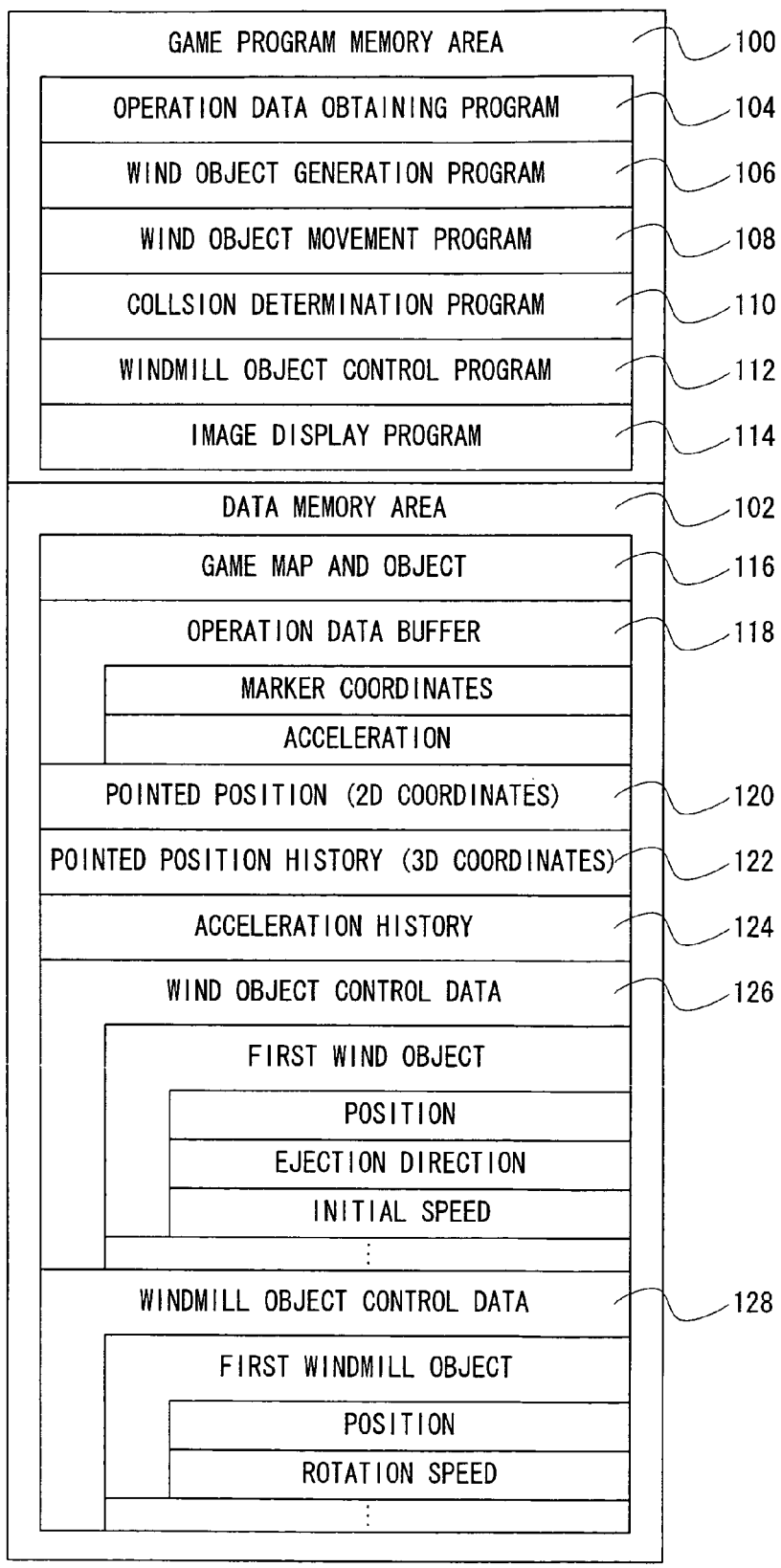
FIG. 7 is an illustrative view showing an exemplary memory map.

FIG. 7 shows one example of a memory map. The main memory 30 includes a game program memory area 100 and a data memory area 102. FIG. 7 shows part of the memory map and other programs and data necessary to proceed a game are also stored.

In a memory area 104 of the game program memory area 100, an operation data obtaining program is stored. By this program, operation data from the controller 14 is obtained by the main memory 30 through the receiving unit 20 and the controller I/F 40. As described above, the controller 14 transmits operation data in a period shorter than or equal to one frame (e.g., 1/60 second) in the game apparatus 12. The sampling periods of the imaging information computing section 56 and the acceleration sensor 64 of the controller 14 are set to shorter periods (e.g., 1/200 second) than one frame in the game apparatus 12, and data transmitted by the controller 14 per transmission includes marker coordinates and acceleration values at a plurality of detection timings. Therefore, in the present embodiment, the game apparatus 12 can obtain operation data including a plurality of pieces of operation information (marker coordinates, acceleration values, etc.) in one frame. The CPU 28 can perform game processing using, where needed, the plurality of pieces of operation information.

In a memory area 106, a wind object generation program is stored. By this program, a wind object 92 is generated in the virtual game space. In the embodiment, when it is determined, based on a motion on the basis of at least one of the position and attitude of the controller 14, that the motion state of the controller 14 is the predetermined state, a wind object 92 is generated. In the embodiment, the motion state of the controller 14 being the predetermined state means that an operation of waving the controller 14 is performed by the player. In the embodiment, whether an operation is the operation of waving the controller 14 is determined based on a pointed position by the controller 14. Specifically, when it is determined that the amount of change in pointed position exceeds a predetermined threshold during one frame, it is determined that the operation of waving the controller 14 has been performed. In another embodiment, as will be described later, whether an operation is a waving operation is determined based on acceleration detected by the controller 14. Since whether the controller 14 has been moved to the predetermined state can be determined by using operation data (including at least one of a pointed position and acceleration) from the controller 14, a novel game in which wind is generated in the virtual game space by an unprecedented operation, such as waving the controller 14, is implemented.

Figure 8:
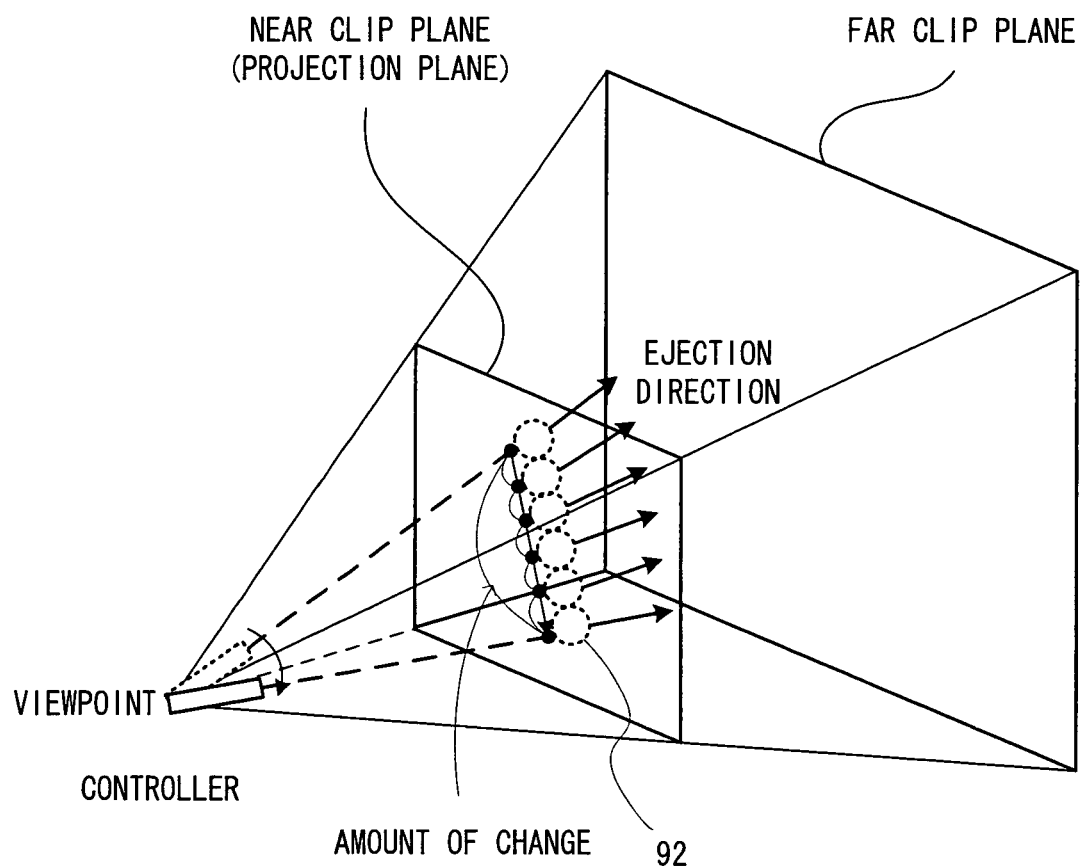
FIG. 8 is an illustrative view for describing a method of generating a wind object based on a pointed position.

An illustrative view for describing generation of a wind object based on a pointed position is shown in FIG. 8. The virtual game space is three dimensional. In the field of view of a virtual camera (viewpoint), space between a near clip plane and a far clip plane is projected onto a projection plane and rendered as a game image. In the embodiment, generation positions of wind objects 92 are defined to be on the near clip plane. Note that although in the embodiment the near clip plane is the projection plane, the projection plane is not limited to the near clip plane.

Specifically, pointed positions (two-dimensional coordinates) by the controller 14 in current and previous frames are projected onto the near clip plane and three-dimensional coordinates in the virtual game space that correspond to each of the pointed positions are calculated. That is, a pointed position on a screen of the monitor 16 by the controller 14 is converted into a corresponding position on the near clip plane. If a difference (amount of change) between coordinates in a current frame and coordinates in a previous frame is greater than the predetermined threshold, it is determined that a waving operation has been performed, and thus generation positions of wind objects 92 are calculated. Specifically, the amount of change in coordinates is divided into regular intervals and each division position is adopted as a generation position. Thus, in the embodiment, the quicker the waving operation is, the larger the number of wind objects 92 to be generated.

A wind object 92 is generated in each position in the virtual game space that is calculated in the above-described manner. The wind objects 92 each are an object composed of a plurality of polygons and are spherical, as will be described later. In addition, the wind objects 92 each are formed of transparent polygons and thus even if the wind objects 92 are generated in the virtual game space, the wind objects 92 are not displayed on the game screen.

In the embodiment, for the ejection direction, i.e., the movement direction, of each wind object 92, a direction of each vector obtained by connecting the viewpoint to each generation position is adopted. That is, the wind objects 92 proceed from the front of the screen to a depth direction.

Furthermore, an initial speed of each wind object 92 is calculated based on the magnitude of an amount of change in coordinates between a current frame and a previous frame, i.e., a speed at which the controller 14 is waved. The greater the amount of change in coordinates, i.e., the quicker the waving operation, the initial speed is set to a higher value. Alternatively, the initial speed may be determined based on a value of acceleration in the Z-axis direction. Alternatively, the movement speed of each wind object 92 may be set to a predetermined value.

Referring back to FIG. 7, in a memory area 108, a wind object movement program is stored. By this program, movement of a wind object 92 is controlled. The wind object 92 moves from its generation position in the aforementioned ejection direction and at the aforementioned initial speed. Although in the embodiment the movement speed is constant, in another embodiment the movement speed may be adjusted according to a condition set in the virtual game space.

In a memory area 110, a collision determination program is stored. By this program, it is determined whether a wind object 92 and a windmill object 90 have collided with each other. For example, it is determined whether a distance between the central coordinates of a wind object 92 and the central coordinates of a windmill object 90 is less than or equal to a distance between a radius r of the wind object 92 and a radius R of the windmill object 90. The windmill object 90 is an object having a hemisphere swelling toward the viewpoint side. The windmill object 90 is displayed as a cross-shaped windmill in a game image by, for example, mapping a texture onto only a portion of the cross shape that represents an entity of the windmill. Since wind is represented by an object, whether there is an influence of wind can be determined by a simple process such as a collision determination between objects.

Figure 9:
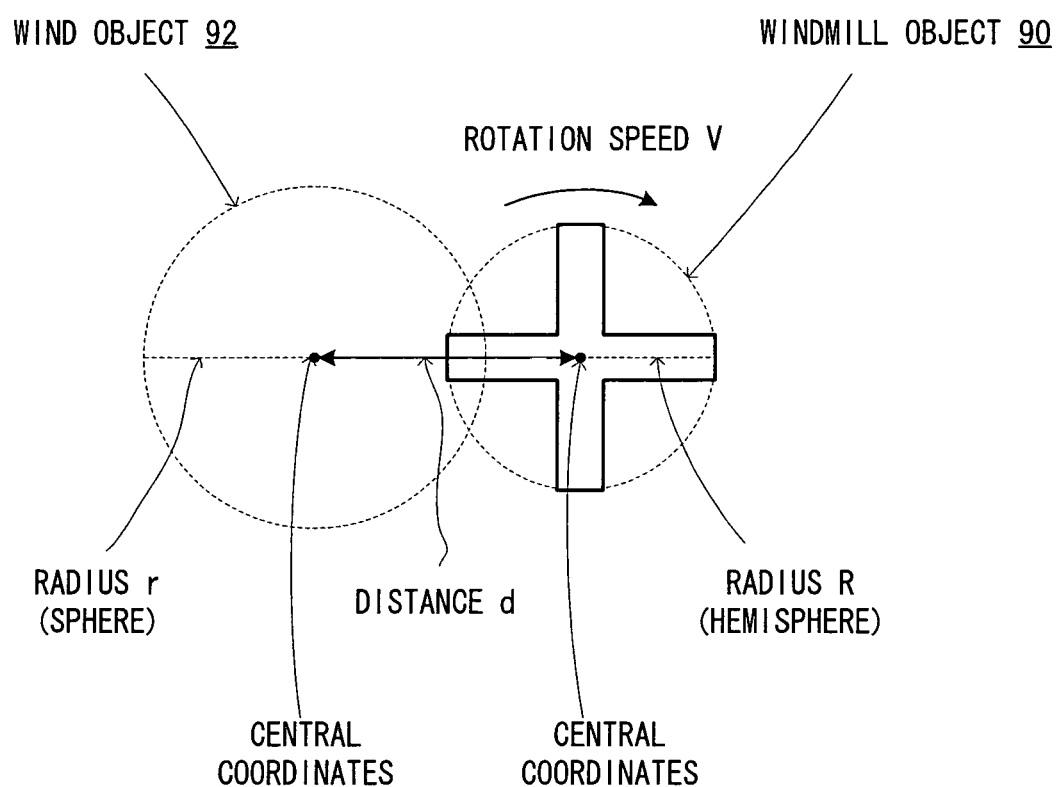
FIG. 9 is an illustrative view showing a positional relationship between a wind object and a windmill object upon collision.

In a memory area 112, a windmill object control program is stored. By this program, the operation of a windmill object 90 is controlled. In the embodiment, each windmill object 90 rotates by catching wind, i.e., by colliding with a wind object 92. Specifically, as shown in FIG. 9, if the radius of a wind object 92 is r, the radius of a windmill object 90 is R, and the distance between the center of the wind object 92 and the center of the windmill object 90 is d, a speed Va calculated by the following expression 1 is added to a current rotation speed V of the windmill object 90.

$$Va = Vp \times (1 - d/(r+R)),\qquad\text{(Expression 1)}$$

where Vp is a predetermined constant. The further apart the two objects are, the lower the rotation speed Va to be added.

As such, when it is determined by a collision determination that a collision has occurred, the motion state of the windmill object 90 is changed according to the distance between the centers of the two. In addition, representation that the degree of influence of wind exerted on the windmill object 90 changes by the positional relationship between the windmill object 90 and the wind object 92 can be made. Such representation is implemented by a simpler process because the windmill object 90 and the wind object 92 are formed in a spherical shape.

Referring back to FIG. 7, in a memory area 114, an image display program is stored. By this program, a three-dimensional game image showing a scene of the virtual game space including windmill objects 90 is generated and the game image is displayed on the monitor 16.

In a memory area 116 of the data memory area 102, game map data, object data, and the like, that are read from the optical disk 22 are stored. The game map data indicates disposition in the virtual game space. The object data includes data indicating objects, such as a windmill object 90, that appear in the virtual game space and data indicating a wind object 92 to be generated according to a player's operation.

A memory area 118 is an operation data buffer and stores therein operation data to be transmitted from the controller 14. As described above, since operation data including a plurality of pieces of operation information is received at least once from the controller 14 during one frame in the game apparatus 12, received operation data is sequentially accumulated in the memory area 118. Specifically, the operation data includes marker coordinate data indicating marker coordinates detected by the imaging information computing section 56 and acceleration data indicating acceleration values of the X, Y, and Z axes detected by the acceleration sensor 64.

In a memory area 120, a pointed position is stored. As described above, the pointed position is a position on the screen pointed to by the controller 14 and is represented by two-dimensional coordinates. Coordinates of the midpoint of each of obtained two sets of marker coordinates (markers 18$a$ and 18$b$) are calculated and the calculated two sets of coordinates are stored as a pointed position. Since, as described above, a plurality of sets of marker coordinates are obtained per frame, for example, coordinates calculated by taking an average of a plurality of sets of midpoint coordinates may be adopted as a pointed position.

In a memory area 122, a pointed position history is stored. Pointed positions for a predetermined number of frames are stored. The pointed position is three-dimensional coordinates obtained by converting into a corresponding position in the virtual game space. That is, as shown in the aforementioned FIG. 8, three-dimensional coordinates of a position in which a two-dimensional coordinate pointed position is projected onto the near clip plane are stored. The amount of change is calculated based on the pointed position history data.

In a memory area 124, an acceleration history is stored. Acceleration values for a predetermined number of frames are stored. Since, as described above, a plurality of acceleration values are obtained in one frame, the acceleration values may also take an average value of the plurality of values, as with pointed positions. Alternatively, a maximum value or a minimum value may be adopted.

In a memory area 126, wind object control data is stored. Information on the position, ejection direction, initial speed, and the like, of each of a plurality of generated wind objects 92 (a first wind object, a second wind object . . . ) is stored. A set of initial coordinates of position information is, as shown in the aforementioned FIG. 8, a generation position of each wind object 92 calculated by the wind object generation program. Thereafter, the position of each wind object 92 is updated, on a frame-by-frame basis, to a set of coordinates after movement that is calculated by the wind object movement program based on an ejection direction and an initial speed.

In a memory area 128, a windmill object control data is stored. Information on the position (central coordinates), rotation speed, and the like, of each of a plurality of windmill objects 90 (a first windmill object, a second windmill object . . . ) disposed in the virtual game space is stored. In the embodiment, the position of each windmill object 90 is fixed to a predetermined set of coordinates. An initial value of the rotation speed is appropriately set and may be zero (i.e., a no rotation state), for example. When it is determined by the collision determination program that there is a collision with a wind object 92, the rotation speed is updated. As shown in the aforementioned FIG. 9 and expression 1, a value Va calculated by the windmill object control program is added to a current rotation speed, whereby a new rotation speed is calculated. Note that when a windmill object 90 is rotating, by subtracting a predetermined value from a rotation speed on a certain time basis, for example, the rotation may be gradually stopped.

Figure 10:
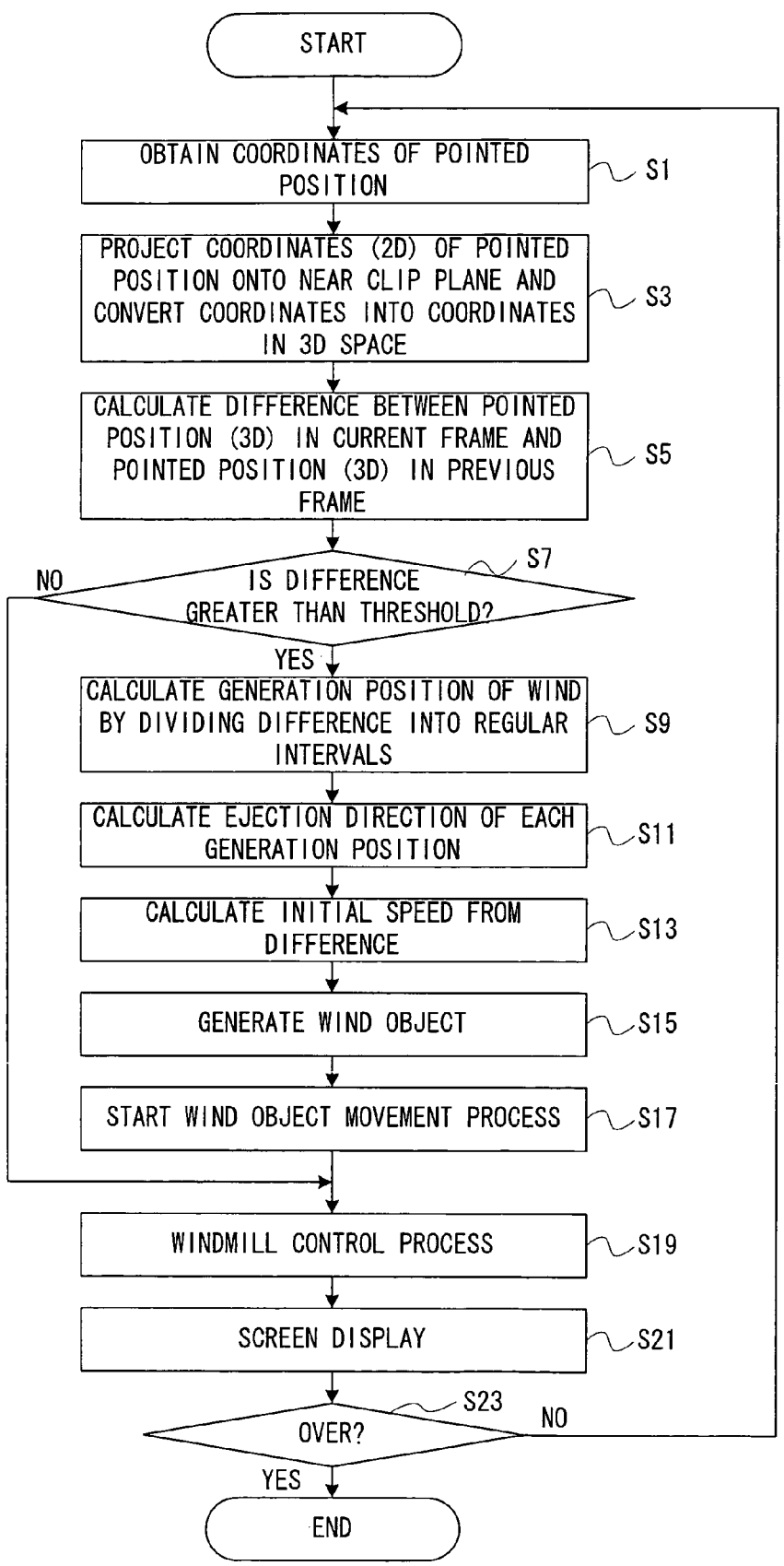
FIG. 10 is a flowchart showing an exemplary game operation of the game apparatus.

FIG. 10 shows one example of game operation of the game apparatus 10. When game processing starts, the CPU 28 reads, in a step S1, marker coordinates from the operation data buffer 118, calculates coordinates (two-dimensional coordinates) of a pointed position, and stores the two-dimensional coordinates representing the pointed position in the pointed position memory area 120.

Note that in FIG. 10 a process to be performed when a waving operation is not performed by the player is omitted; in such a case, steps S1 to S17 are not performed and the process proceeds to a step S19.

Then, in a step S3, as shown in FIG. 8, the CPU 28 projects the pointed position to onto the near clip plane and converts the pointed position into coordinates in 3D virtual game space. The calculated three-dimensional coordinates of the pointed position are stored in the pointed position history memory area 122.

Subsequently, in a step S5, the CPU 28 calculates a difference (an amount of change in coordinates) between the pointed position in a current frame and a pointed position in a previous frame based on data in the pointed position history memory area 122. The difference in position coordinates is a vector and thus a scalar value of the calculated vector is also calculated.

In a step S7, the CPU 28 determines whether the difference is greater than a predetermined threshold. This determination is a determination as to whether a waving operation has been performed. The predetermined threshold is set to an appropriate value by which a change in pointed position can be considered to be equivalent to a waving operation. By this determination, it is possible to prevent wind from being generated by such a change in pointed position that is equivalent to hand shake.

If "YES" in the step S7, that is, if an operation of waving the controller 14 has been performed, then in a step S9, the CPU 28 divides the difference into regular intervals and thereby calculates a generation position of each wind object 92. As shown in FIG. 8, coordinates of each position obtained by dividing a line segment connecting a pointed position in a previous frame to a pointed position in a current frame into regular intervals, are calculated. Thus, a number of wind objects 92 according to the degree of a speed at which the controller 14 is waved can be generated.

In a step S11, the CPU 28 calculates an ejection direction of each generation position. In the embodiment, each ejection direction is a unit vector of a vector connecting a viewpoint (virtual camera position) to each generation position.

In a step S13, the CPU 28 calculates an initial speed from the difference in pointed position. As described above, the movement speed of wind is increased when a quick waving operation is performed, and thus, the greater the difference (amount of change in coordinates), the higher the value of the initial speed. The value of the initial speed may be calculated based on an amount of change in coordinates and according to a predetermined expression, or may be selected from a table in which speeds associated with amounts of change in coordinates are stored in advance. In another embodiment, the initial speed may be calculated based on a value of acceleration (Z-axis direction); in this case too, as in the case of the amount of change in coordinates, a wind object 92 can be moved at a speed according to the degree of an operation of waving the controller 14.

In a step S15, the CPU 28 generates wind objects 92. By this, the wind objects 92 are disposed in the generation positions, respectively, in the virtual game space. In the wind object control data memory area 126, information indicating the position, ejection direction, and initial speed of each wind object 92 is stored.

Then, in a step S17, the CPU 28 starts a wind object movement process. By the wind object movement process, the movement of each of the generated wind objects 92 is controlled. The CPU 28 performs a wind object movement process, such as the one shown in FIG. 11, on each of the plurality of generated wind objects 92. The wind object movement process is performed in parallel with the main process of FIG. 10. When a movement process of each wind object 92 starts in the step S17, the process proceeds to a step S19.

Figure 11:
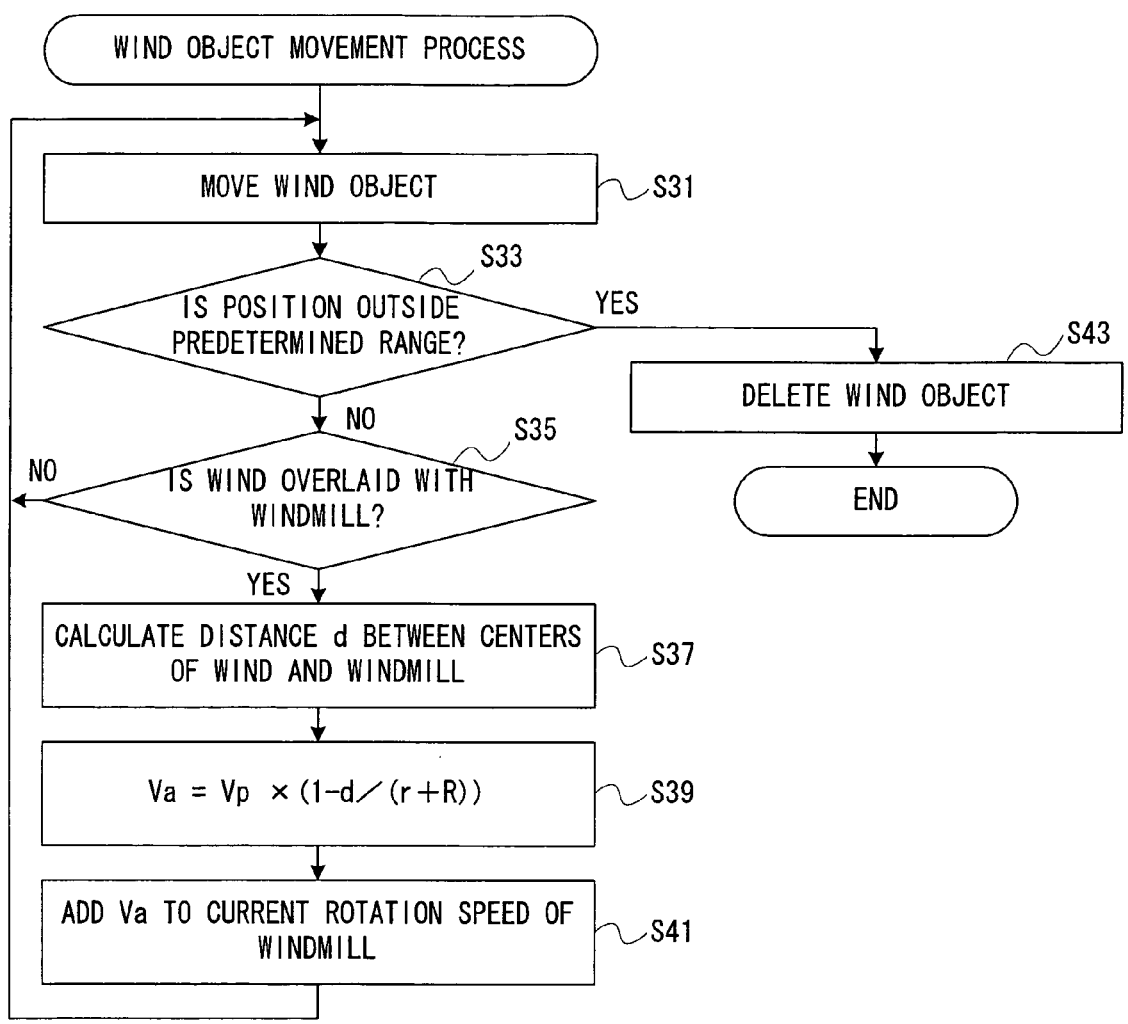
FIG. 11 is a flowchart showing an exemplary operation of a wind object movement process to be started in FIG. 10.

As shown in FIG. 11, when the wind object movement process starts, the CPU 28 moves, in a step S31, a wind object 92. Specifically, the CPU 28 moves a wind object 92 from a current position toward an ejection direction at an initial speed and thereby calculates coordinates of a position after movement and updates position information on the wind object 92 in the memory area 126 to the coordinates.

Then, in a step S33, the CPU 28 determines whether the position after movement is outside a predetermined range. That is, it is determined whether the wind object 92 has gone out of a clipping area rendered as a game image.

If "NO" in the step S33, then the CPU 28 determines in a step S35 whether the wind object 92 is overlaid with any of the windmill objects 90. That is, a collision determination between the wind object 92 and any of the windmill objects 90 is performed. As such, in the embodiment, wind is represented by an object, and thus, by a collision determination between objects, whether there is an influence of wind on a windmill object 90 in the virtual game space can be determined.

If "YES" in the step S35, i.e., the wind object 92 has collided with a windmill object 90, then the CPU 28 calculates, in a step S37, a distance d between central coordinates of the wind object 92 and central coordinates of the windmill object 90 based on position information on the two objects.

In a subsequent step S39, the CPU 28 calculates a degree of influence exerted on the windmill object 90 by the wind object 92. That is, a rotation speed Va to be added to the rotation speed of the windmill object 90 is calculated according to the aforementioned expression 1.

Then, in a step S41, the CPU 28 adds the Va to a current rotation speed of the collided windmill object 90 and updates information on the rotation speed of the windmill object 90 in the windmill object control data memory area 128. By this, the windmill object 90 having collided with the wind object 92 is rotated at an updated speed.

When the step S41 is completed or if "NO" in the step S35, then the process returns to the step S31. Until it is determined to be "YES" in the step S33, each step of the wind object movement process is repeatedly performed on a frame-by-frame basis.

If "YES" in the step S33, i.e., the wind object 92 has moved outside the range to be rendered, then the CPU 28 deletes, in a step S43, the wind object 92 from the virtual game space. Information on the wind object 92 in the wind object control data memory area 126 is cleared. When the step S43 is completed, then the wind object movement process ends.

Referring back to the description of FIG. 10, if "NO" in the step S7, i.e., it is not recognized as a waving operation, then the process proceeds to the step S19. In the step S19, the CPU 28 performs a windmill control process. By this, each windmill object 90 whose rotation speed in the memory area 128 is not zero is rotated based on each rotation speed.

In a step S21, the CPU 28 performs a screen display process. By this, a game screen showing a state of the virtual game space including the windmill objects 90 is generated and displayed on the monitor 16. When a windmill object 90 is rotated by catching wind, a game screen showing a scene in which the windmill object 90 rotates is displayed on the monitor 16.

In a step S23, the CPU 28 determines whether the game is over. If "NO", then the process returns to the step S1 and the game processing is repeated, and if "YES", then the game processing ends.

In the aforementioned flowchart, in the step S7, a determination of a waving operation is made by a condition that the amount of change in pointed position is greater than the threshold. However, in a variant, when an amount of change in pointed position by the controller 14 is obtained, it is considered, regardless of the magnitude of the amount of change, that an operation on the controller 14 has been performed and a wind object 92 may be generated. In the aforementioned flowchart, in the step S5, a difference between a pointed position in a current frame and a pointed position in a previous frame is calculated. However, in a variant, a difference between a pointed position in a current frame and a pointed position in some previous frame may be calculated. Alternatively, a difference between a starting point of a change in coordinates of a pointed position and an ending point may be calculated. By doing this, a waving operation of a longer period of time can be determined.

According to the embodiment, wind to be generated according to a player's operation is represented as a wind object 92, and by a collision with the wind object 92 a windmill object 90 in the virtual game space moves by the influence of the wind. Therefore, wind to be generated according to a player's operation can be represented by a simple process by using an object. In addition, by preparing wind object data, data that defines a multiplicity of winds in arbitrary positions in the virtual game space does not need to be prepared, and thus, wind can be represented in an arbitrary position in the game space with a small memory capacity.

In the aforementioned embodiment, whether an operation of waving the controller 14 has been performed is determined based on information on a pointed position by the controller 14. However, in another embodiment, whether the controller 14 has been moved to the predetermined state, i.e., whether an operation of waving the controller 14 has been performed, may be determined based on acceleration information.

When the player waves the controller 14 held by the player pointing to the screen, centrifugal force is applied to the front (Z-axis direction) of the controller 14. Thus, in this embodiment, when a Z-axis direction acceleration higher than the predetermined threshold is detected, it is determined that an operation of waving the controller 14 has been performed.

A direction in which the controller 14 is waved may be considered as one of wind generation conditions. In the embodiment, a direction in which the controller 14 is waved is determined based on acceleration information and when it is determined that the controller 14 is waved in a predetermined direction, wind is generated.

The number of wind objects 92 to be generated is set according to the magnitude of acceleration. The harder, i.e., the quicker, the controller 14 is to be waved, the larger the number of wind objects 92 to be generated.

Figure 12:
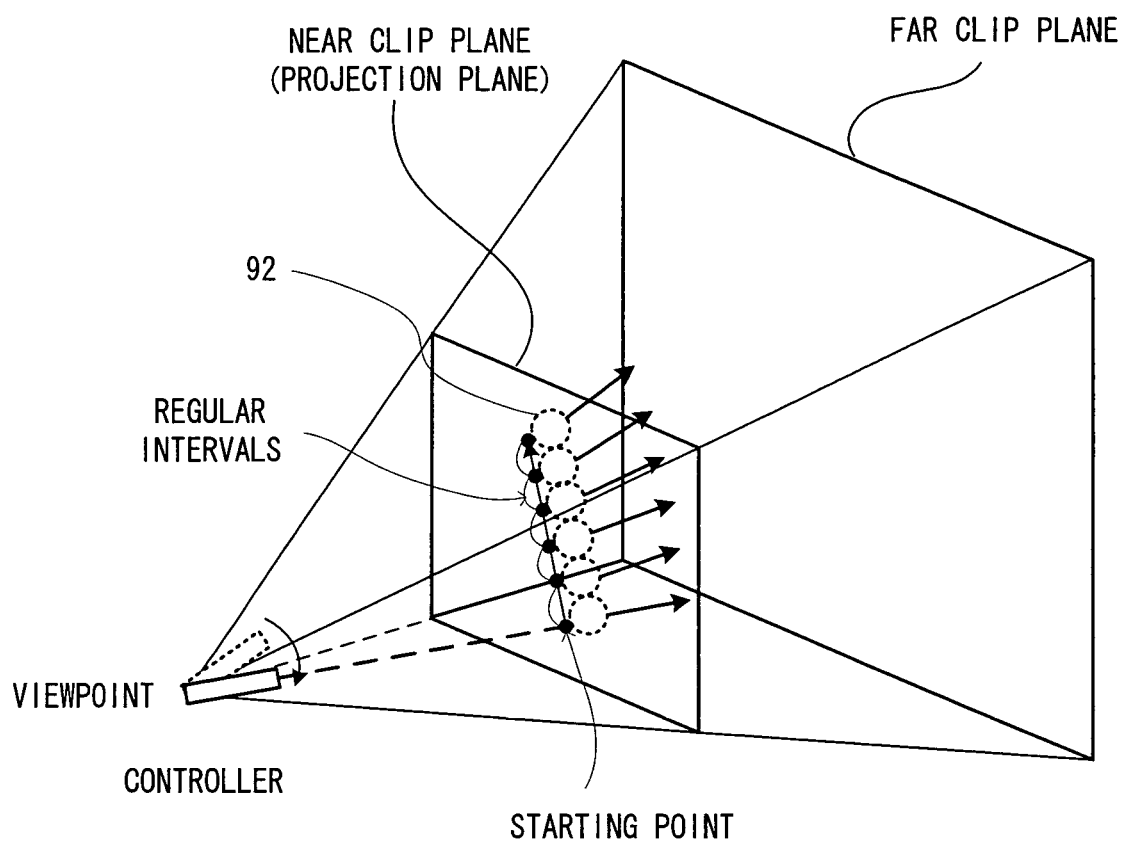
FIG. 12 is an illustrative view for describing a method of generating a wind object based on acceleration in another embodiment.

How to determine a generation position of each wind object 92 is shown in FIG. 12. First, a pointed position by the controller 14 is set as a starting point. Coordinates (two-dimensional) of the pointed position are, as with the aforementioned embodiment, converted into coordinates (three-dimensional) on a near clip plane in the virtual game space. The starting point is also one of generation positions. Then, by providing regular intervals from the starting point in a direction opposite to a direction in which the controller 14 is waved, generation positions of the rest of the wind objects 92 are calculated. A value of generation intervals between the wind objects 92 is appropriately set.

In the embodiment, a starting point used to calculate a generation position is calculated from a pointed position by the controller 14. That is, generation of a wind object 92 is controlled based on both a pointed position and acceleration to be detected by the controller 14. However, when generation of a wind object 92 is controlled based only on acceleration information, as a starting point, predetermined coordinates (e.g., the center of a display screen) or arbitrary coordinates that are randomly determined may be adopted.

An ejection direction of each wind object 92 is also calculated, as with the aforementioned embodiment, by a unit vector of a vector connecting a viewpoint to each generation position.

Figure 13:
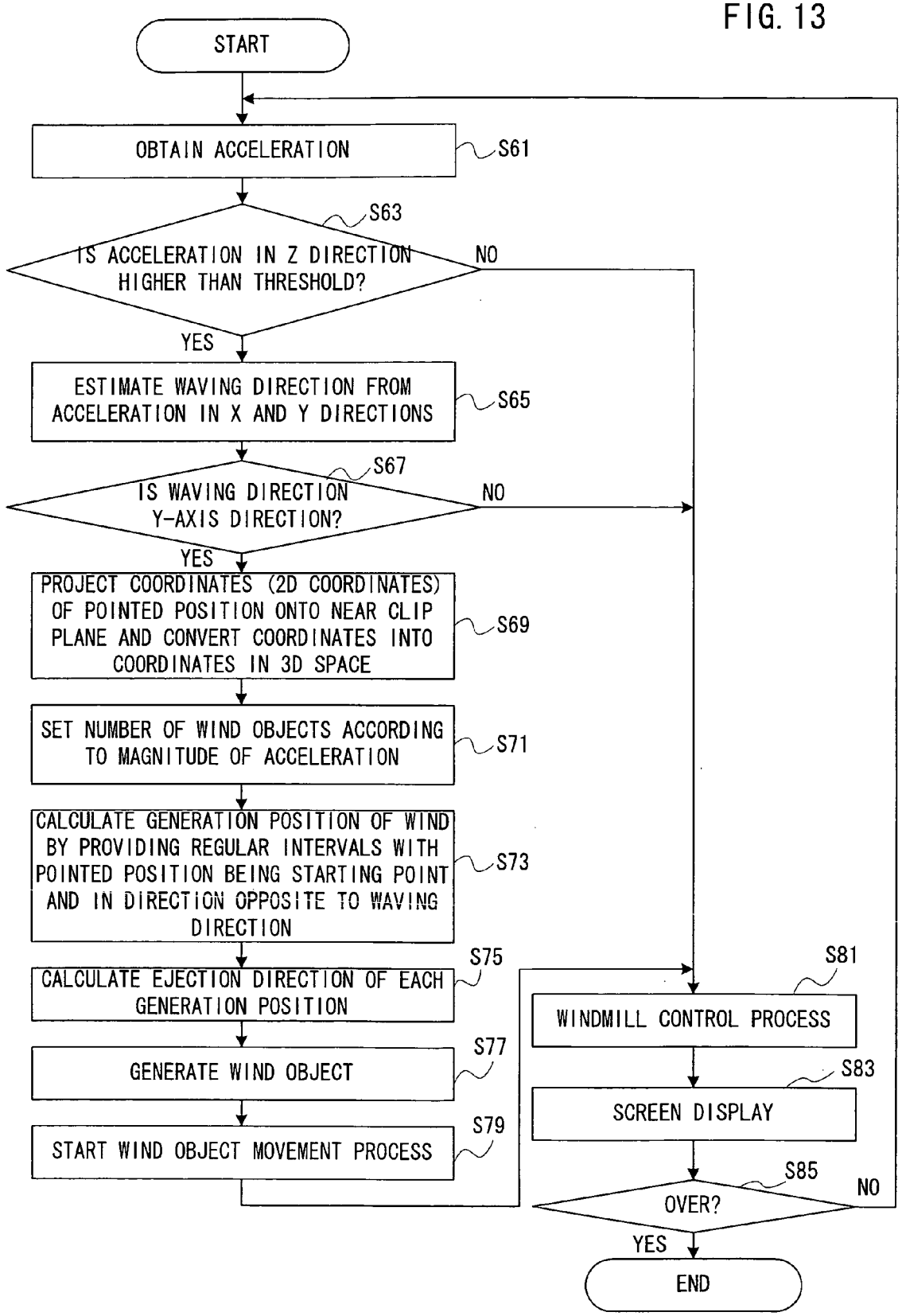
FIG. 13 is a flowchart showing an exemplary game operation of the game apparatus in another embodiment.

One example of game operation in the embodiment is shown in FIG. 13. The CPU 28 of the game apparatus 12 reads, in a step S61, acceleration data from the operation data buffer 118 and obtains an acceleration value of each axis direction. Note that since, as described above, operation data including a plurality of pieces of operation information in one frame is received, as the acceleration value of each axis direction, an average value may be calculated. Alternatively, a maximum value or a minimum value may be adopted. The obtained acceleration value of each axis direction is stored in the acceleration history memory area 124.

Then, in a step S63, the CPU 28 determines whether the acceleration in the Z-axis direction is higher than a predetermined threshold. That is, it is determined whether an operation of waving the controller 14 has been performed. For example, the determination may be made based only on an acceleration value of the Z-axis direction in a current frame. Alternatively, by referring to acceleration values for a predetermined number of frames stored in the acceleration history memory area 124, a waving operation can be determined with high accuracy. By this, it is possible to prevent wind from being generated by hand shake or the like.

If "YES" in the step S63, then the CPU 28 estimates, in a step S65, a waving direction from the accelerations in the X and Y-axis directions. For example, in the case in which the controller 14 is held, as shown in FIG. 3, by the player in a reference state (a state in which the X-axis direction is a left-right direction, a Y-axis direction is an up-down direction, and the Z-axis direction is a front-rear direction), when the acceleration in the X-axis direction is zero and acceleration other than gravitational acceleration is detected in the Y-axis direction, the waving direction is estimated to be the up-down direction. When acceleration in the X-axis direction is detected and the acceleration in the Y-axis direction is zero (i.e., only gravitational acceleration), the waving direction is estimated to be the left-right direction. When the controller 14 is held by the player in a state (e.g., a state in which the controller 14 is tilted by 90 degrees so that gravitational acceleration is detected in the X-axis direction) other than the reference state such as the one shown in FIG. 3, an acceleration value for a frame when the controller 14 is in a standstill state (a state in which only gravitational acceleration is detected) should be subtracted from an acceleration value for a current frame, for each axis. By doing so, only acceleration excluding gravitational acceleration can be detected; even when, for example, an operation of waving the controller 14 being tilted by 90 degrees is performed, the waving direction can be accurately estimated without being influenced by gravitational acceleration.

In a step S67, the CPU 28 determines whether the waving direction is a predetermined direction (the Y-axis direction in the embodiment, i.e., the up-down direction when the controller 14 is in the reference state). As such, in the embodiment, only when the controller 14 is waved in the predetermined direction, wind is generated. Namely, it is possible to generate wind when the controller 14 is waved in the predetermined direction; however, it is not possible to generate wind if the controller 14 is waved in other directions. Therefore, a game in which wind is generated by an operation, such as using the controller 14 to resemble a fan or the like in a pseudo manner, can be implemented. In the embodiment, when the waving direction is the Y-axis direction, wind is generated, and thus, an operation feeling as if the player were waving a fan held such that the plane is a XZ plane can be provided to the player.

If "YES" in the step S67, then in a step S69 the CPU 28 projects, as with the aforementioned step S3 in FIG. 10, coordinates of a pointed position by the controller 14 onto the near clip plane and converts the coordinates into coordinates in the 3D virtual game space.

In a step S71, the CPU 28 sets the number of wind objects 92 to be generated, according to the magnitude of acceleration. For example, the harder the controller 14 is to be waved, i.e., the higher the acceleration of the Z axis is, the larger the number of wind objects 92 to be generated. Note that, though omitted in FIG. 13, an initial speed may be calculated according to the magnitude of acceleration.

Subsequently, in a step S73, the CPU 28 provides, as shown in the aforementioned FIG. 12, regular intervals with the pointed position being a starting point and in a direction opposite to the waving direction and thereby calculates the set number of generation positions.

In a step S75, the CPU 28 calculates, as with the step S11 in FIG. 10 of the aforementioned embodiment, an ejection direction of each generation position. Then, the CPU 28 generates, in a step S77, wind objects, as with the aforementioned step S15 and starts, in a step S79, a wind object movement process. The operation of the wind object movement process performed for each wind object 92 is the same as that in the aforementioned FIG. 11. When the step S79 is completed, then the process proceeds to a step S81.

On the other hand, if "NO" in the step S67, i.e., a waving operation in the predetermined direction is not performed, then without generating wind, the process proceeds to the step S81. If "NO" in the step S63, i.e., a waving operation is not detected, then the process directly proceeds to the step S81.

In the step S81, the CPU 28 performs a windmill control process in the same manner as the aforementioned step S19. In a step S83, screen display is performed in the same manner as the aforementioned step S21. Then, in a step S85, the CPU 28 determines whether the game is over. If "NO", then the process returns to the step S61 and the game processing is repeated, and if "YES", then the game processing ends.

In the aforementioned FIG. 13, in the step S63, a determination of a waving operation is made by a condition that the acceleration is higher than the threshold. However, in a variant, when acceleration other than gravitational acceleration is detected, it is considered, regardless of the magnitude of the acceleration, that a waving operation has been performed and a wind object 92 may be generated.

In the aforementioned embodiments, the controller 14 includes both the imaging information computing section 56 and the acceleration sensor 64. However, when a wind object 92 is generated by making a determination of a waving operation based only on the change in pointed position, the acceleration sensor 64 does not need to be provided to the controller 14. In contrast, when a wind object 92 is generated by making a determination of a waving operation based only on acceleration information, the imaging information computing section 56 does not need to be provided to the controller 14.

Furthermore, although in the aforementioned embodiments the change in pointed position is calculated by the imaging information computing section 56, the example embodiments of the present invention are not limited thereto and other methods may be used. For example, an amount of change in cursor position that moves on a screen based on an up, down, left, or right direction indication obtained by operating the cross key 54a on the controller 14 may be calculated. In another technique, a touch panel may be placed on a monitor screen, position coordinates on the screen pointed to by directly touching the monitor with a finger, pen, or the like, may be detected by the touch panel, and an amount of change in the detected coordinates may be calculated. In still another technique, by using, instead of the controller 14, any other pointing device, such as a mouse, a trackpad, or trackball, that points to position coordinates on a screen, an amount of change in pointed position on the screen may be calculated based on an output value to be outputted from the mouse or the like.

Although the example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer-readable storage medium storing a program executable by a processor of an information processing apparatus using an operation apparatus, which incorporates a motion detector, to be operated by a player, said information processing apparatus displaying a movable object disposed in virtual space on a display apparatus, wherein said program causes said processor of said information processing apparatus to perform:
    detecting a motion state of said operation apparatus based on a motion of said operation apparatus;
    generating a wind object in said virtual space directly according to operation data from said operation apparatus when said motion state is a predetermined state;
    moving said wind object;
    determining a collision between said wind object and said movable object; and
    controlling the movable object including moving said movable object when it is determined in said collision determining that the collision has occurred.

2. The non-transitory computer-readable storage medium storing the program according to claim 1, wherein
    said motion detector includes an imaging device for imaging an imaging target that indicates a position of said operation apparatus,
    said program further causes said processor of said apparatus to perform:
    calculating coordinates in said virtual space based on a position of said imaging target imaged by said imaging device; and
    calculating an amount of change in said coordinates in a unit of time, and
    in said generating the wind object, when said amount of change satisfies a predetermined condition, said wind object is generated.

3. The non-transitory computer-readable storage medium storing a program according to claim 2, wherein
    said program further causes said processor of said apparatus to perform dividing said amount of change into regular intervals, and
    in said generating the wind object, wind objects are generated in positions between which the regular intervals are provided by the dividing.

4. The non-transitory computer-readable storage medium storing the program according to claim 1, wherein
    said motion detector includes an acceleration sensor,
    said program further causes said processor of said apparatus to perform obtaining acceleration detected by said acceleration sensor, and
    in said generating the wind object, when said acceleration satisfies a predetermined condition, said wind object is generated.

5. The non-transitory computer-readable storage medium storing the program according to claim 4, wherein
    said program further causes said processor of said apparatus to perform setting a number of wind objects according to said acceleration, and
    in said generating the wind object, wind objects whose number is set in said setting the number are generated in positions between which regular intervals are provided.

6. The non-transitory computer-readable storage medium storing the program according to claim 4, wherein
    said acceleration sensor detects at least acceleration in a first direction of said operation apparatus and acceleration in a second direction that is different from said first direction, and
    in said generating the wind object, when the acceleration in said first direction is obtained, said wind object is generated.

7. The non-transitory computer-readable storage medium storing the program according to claim 1, wherein
    each of said movable object and said wind object is formed as a sphere having central coordinates and a diameter of a predetermined length,
    in said determining the collision, the collision between said movable object as said sphere and said wind object as said sphere is determined,
    said program further causes said processor of said apparatus to perform calculating, when it is determined in said determining the collision that the collision has occurred, a distance between the central coordinates of said movable object and the central coordinates of said wind object, and
    in said controlling the movable object, a motion state of said movable object is changed according to the distance calculated in said calculating the distance.

8. The non-transitory computer-readable storage medium storing the program according to claim 1, wherein in said moving the wind object, said wind object is moved at a speed according to a change in the movement of said operation apparatus detected in said detecting the motion state.

9. The non-transitory computer-readable storage medium according in claim 1, wherein the movable object is a non-player character and the wind object is controlled as a player character.

10. An apparatus that has an operation apparatus, which incorporates a motion detector, to be operated by a player and displays a movable object disposed in virtual space on a display apparatus, comprising:
a processing system, comprising a computer processor, configured to perform:
detection of a motion state of said operation apparatus based on a motion of said operation apparatus as detected by the motion detector;
a wind object generation for generating a wind object in said virtual space directly according to operation data from said operation apparatus when said motion state is a predetermined state;
a wind object movement for moving said wind object;
a collision determination for determining a collision between said wind object and said movable object; and
a movable object for moving said movable object when it is determined by said collision determination that the collision has occurred.

11. The apparatus according to claim 10, wherein
said motion detector includes an imaging device for imaging an imaging target that indicates a position of said operation apparatus,
said processing system of said apparatus has configuration to perform:
calculation of coordinates in said virtual space based on a position of said imaging target imaged by said imaging device; and
calculation of an amount of change in said coordinates in a unit of time; and
the wind object is generated by the wind object generation when said amount of change satisfies a predetermined condition.

12. The apparatus according to claim 11, wherein
said processing system has a configuration to perform division of said amount of change into regular intervals, and
when the wind object is generated by the wind object generation, wind objects are generated in positions between which the regular intervals are provided by the division.

13. The apparatus according to claim 10, wherein
said motion detector includes an acceleration sensor,
said processing system has a configuration to perform obtainment of acceleration detected by said acceleration sensor, and
the wind object is generated by the wind object generation when said acceleration satisfies a predetermined condition.

14. The apparatus according to claim 13, wherein
said processing system has a configuration to perform setting of a number of wind objects according to said acceleration, and
when the wind object is generated by the wind object generation, wind objects whose number is set in said setting the number are generated in positions between which regular intervals are provided.

15. The apparatus according to claim 13, wherein
said acceleration sensor detects at least acceleration in a first direction of said operation apparatus and acceleration in a second direction that is different from said first direction, and
the wind object is generated by the wind object generation when the acceleration in said first direction is obtained.

16. The apparatus according to claim 10, wherein
each of said movable object and said wind object is formed as a sphere having central coordinates and a diameter of a predetermined length,
the collision determination determines the collision between said movable object as said sphere and said wind object as said sphere is determined,
the processing system of said apparatus has a configuration to perform calculation of, when it is determined by the collision determination that the collision has occurred, a distance between the central coordinates of said movable object and the central coordinates of said wind object, and
the movable object control changes a motion state of said movable object according to the distance calculated in said calculation of the distance.

17. The apparatus according to claim 10, the wind object movement moves said wind object at a speed according to a change in the movement of said operation apparatus detected in the motion state.

18. The system according to claim 10, wherein the processing system is further configured to control the movable object as a non-player character and to control the wind object as a player character.

19. An information processing system using an operation apparatus which incorporates a motion detector and is operated by a player, and displaying a movable object disposed in virtual space on a display apparatus, comprising:
a detecting unit which detects a motion state of said operation apparatus based on the motion of said operation apparatus;
a generating unit which generates a wind object in said virtual space directly according to operation data from said operation apparatus when said motion state is a predetermined state;
a moving unit which moves said wind object;
a determining unit which determines a collision between said wind object and said movable object; and
a controlling unit which controls the movable object including moving said movable object when it is determined by said determining unit that the collision has occurred.

20. The system according to claim 19, wherein the movable object is a non-player character and the wind object is controlled as a player character.

21. The system according to claim 19, wherein
said motion detector includes an acceleration sensor configured to detect acceleration, and
the wind object is generated by the generation unit when said detected acceleration satisfies a predetermined condition.

22. A method of controlling a movable object disposed in virtual space on a display apparatus by an information processing apparatus using an operation apparatus which incorporates a motion detector and is operated by a player, the method comprising:
detecting a motion state of said operation apparatus based on a motion of said operation apparatus;

generating a wind object in said virtual space directly according to operation data from said operation apparatus when said motion state is a predetermined state;
moving said wind object;
determining a collision between said wind object and said movable object; and
controlling the movable object including moving said movable object when it is determined in said determining step that the collision has occurred.

23. The method according to claim 22, wherein the movable object is a non-player character and the wind object is controlled as a player character.

24. The method according to claim 22, wherein
said motion detector includes an acceleration sensor for detecting acceleration, and
the wind object is generated when the detected acceleration satisfies a predetermined condition.

* * * * *